(12) United States Patent
Macedo et al.

(10) Patent No.: US 7,279,528 B2
(45) Date of Patent: Oct. 9, 2007

(54) ADHESIVE COMPONENTS AND PROCESS FOR MANUFACTURE

(75) Inventors: Anne Vera Macedo, Brussels (BE); Kenneth Lewias, Tervuran (BE); John Richard Shutt, Tervuren (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/489,025

(22) PCT Filed: Sep. 19, 2002

(86) PCT No.: PCT/EP02/10686

§ 371 (c)(1), (2), (4) Date: Aug. 23, 2004

(87) PCT Pub. No.: WO03/025036

PCT Pub. Date: Mar. 27, 2003

(65) Prior Publication Data

US 2004/0266947 A1    Dec. 30, 2004

(30) Foreign Application Priority Data

Sep. 19, 2001   (EP) .................. 01203566

(51) Int. Cl.
*C08L 51/00* (2006.01)
(52) U.S. Cl. ............ 525/285; 525/74; 525/426; 525/338; 525/69; 524/270
(58) Field of Classification Search ............ 525/285, 525/74, 416, 338, 69, 426; 524/270
See application file for complete search history.

(56) References Cited

U.S. PATENT DOCUMENTS

| | | |
|---|---|---|
| 2,875,218 A | 2/1959 | Dazzi |
| 3,161,620 A | 12/1964 | Perkins, Jr. et al. |
| 3,328,409 A | 6/1967 | Wakeman et al. |
| 3,763,053 A | 10/1973 | Bills |
| 3,933,720 A | 1/1976 | Iwai et al. |
| 3,954,912 A | 5/1976 | Werner et al. |
| 4,086,198 A | 4/1978 | Mizui et al. |
| 4,207,223 A | 6/1980 | Schulde et al. |
| 4,315,863 A | 2/1982 | Tomoshige et al. |
| 4,328,090 A | 5/1982 | Stuckey, Jr. et al. |
| 4,500,424 A | 2/1985 | Simpson et al. |
| 4,526,577 A | 7/1985 | Schmidt, Jr. et al. |
| 4,629,766 A | 12/1986 | Malatesta et al. |
| 4,670,349 A * | 6/1987 | Nakagawa et al. ......... 428/516 |
| 4,686,030 A | 8/1987 | Ward |
| 4,719,260 A * | 1/1988 | Stuart et al. ................. 525/74 |
| 4,835,200 A | 5/1989 | St. Clair |
| 4,846,961 A | 7/1989 | Robinson et al. |
| 4,849,093 A | 7/1989 | Vauk et al. |
| 4,919,260 A | 4/1990 | Cunningham |
| 5,019,531 A | 5/1991 | Awaya et al. |
| 5,028,646 A | 7/1991 | Miller et al. |
| 5,171,793 A | 12/1992 | Johnson et al. |
| 5,256,440 A | 10/1993 | Appel et al. |
| 5,317,055 A | 5/1994 | Yang |
| 5,502,104 A | 3/1996 | Hohner et al. |
| 5,641,823 A * | 6/1997 | Masse et al. ............... 524/270 |
| 5,820,749 A | 10/1998 | Haluska et al. |
| 5,936,058 A | 8/1999 | Schauder |
| 6,402,867 B1 | 6/2002 | Kaido et al. |
| 6,541,098 B2 * | 4/2003 | Venkatasanthanam et al. ... 428/161 |
| 2004/0260021 A1 | 12/2004 | Macedo et al. |
| 2004/0266947 A1 | 12/2004 | Macedo et al. |

FOREIGN PATENT DOCUMENTS

| | | |
|---|---|---|
| EP | 0 070 638 | 1/1983 |
| EP | 0 101 0961 | 3/1984 |
| EP | 0 082 726 | 4/1986 |
| EP | 0 088 510 | 3/1988 |
| EP | 0 294 933 | 12/1988 |
| EP | 0 410 412 | 1/1991 |
| EP | 0 451 919 | 10/1991 |
| EP | 0 631 775 | 1/1995 |
| EP | 0 703 275 | 3/1996 |
| GB | 1 601 815 | 11/1981 |
| JP | 52090535 A | 7/1977 |
| WO | 90/15111 | 12/1990 |
| WO | WO 91/02039 | 2/1991 |
| WO | WO93/03093 | 2/1993 |
| WO | WO 94/01239 | 1/1994 |
| WO | WO95/12623 | 5/1995 |
| WO | WO 96/18478 | 6/1996 |
| WO | WO 03/025037 | 3/2003 |
| WO | WO 03/025038 | 3/2003 |
| WO | WO 03/075894 | 9/2003 |

* cited by examiner

*Primary Examiner*—James J. Seidleck
*Assistant Examiner*—Olga Asinovsky

(57) ABSTRACT

Resins and oligomer materials and/or combinations thereof grafted with an unsaturated acid or anhydride, such as maleic anhydride, are disclosed herein. The grafted materials are useful in adhesive formulations, particularly in hot melt adhesive applications.

14 Claims, 9 Drawing Sheets

ADHESIVE COMPONENTS AND PROCESS FOR MANUFACTURE

CROSS REFERENCE TO RELATED APPLICATIONS

This application is a National Stage Application of International Application No. PCT/EP02/10686, filed Sep. 19, 2002, which claims priority to EP 01203566.3, filed Sep. 19, 2001.

BACKGROUND

This invention relates to grafted hydrocarbon resins and oligomer compositions, including, but not limited to, adhesives and adhesive components incorporating the grafted compositions, and methods for making and using the compositions.

Relatively low molecular weight resins (usually with molecular weights ranging from 400 to 1500 Mn) are useful in many applications, including tackifying agents for adhesives, ink additives, polymer additives, road marking resins, paper sizing and pipe wrapping. Certain commercial grades of tall oil rosin esters (TOREs) or terpene phenolic resins (TPRs) are used to improve the performance of ethylene vinyl acetate (EVA)-based hot-melt adhesives (HMAs). TOREs, however, suffer from color instability and odor generation at application temperatures. Hydrocarbon resins, particularly hydrogenated cycloaliphatic resins, are superior in color stability and odor generation, but do not exhibit high all-around performance on polar surfaces, such as polyethylene terephthalate (PET) and acrylic varnishes, where TOREs are often used. The adhesive industry recognizes this problem but has yet to achieve a solution. Thus, a need exists for a hydrocarbon resin or an adhesive component having enhanced HMA performance without the instability and odor generation normally associated with TOREs or TPRs.

U.S. Pat. No. 4,719,260 discloses a hot-melt adhesive composition comprising an amorphous polymer containing polypropylene and a graft copolymer of a polycyclic saturated aliphatic hydrocarbon resin and maleic anhydride having improved adhesion to substrates such as polyethylene. It does not disclose the use of an at least partially hydrogenated aromatic hydrocarbon resin. Further, it is generally known that aromatic resins are generally less compatible with saturated hydrocarbon polymers such as those described in U.S. Pat. No. 4,719,260 and do not exhibit the same advantages in adhering to substrates such as polyethylene.

U.S. Pat. No. 3,161,620 discloses a process for reacting maleic anhydride with thermally-produced hydrocarbon resins. It does not disclose at least partially hydrogenating the resin or oligomers before reaction with the maleic anhydride.

EP 0 088 510 discloses polar synthetic petroleum resins. In the embodiments disclosed therein the cyclopentadiene oligomer mixture is reacted with a carboxylic acid or anhydride such as phthalic or maleic acids and then hydrogenated. The reaction proceeds via the acid group reacting with the unsaturation of the resin oligomer thus forming an ester group at the point of attachment. The resulting resin product can be generally classified as a norbornyl ester. The grafted materials disclosed herein are believed to be produced through a different route, namely via an unsaturated bond of the acid or anhydride onto the resin which is preferably at least partially hydrogenated and more preferably substantially hydrogenated as defined herein.

Performance of hydrocarbon resins, particularly hydrogenated aromatic cycloaliphatic resins, on polar surfaces can be improved by modifying the resins to include polar functionality. Grafting functional components onto conventional hydrocarbon resins and/or resin oligomers and optionally combining the grafted resin or grafted oligomer material with another tackifying resin or other adhesive components improves performance and provides advantages over TOREs and TPRs when used in hot melt and other adhesive formulations. In particular, applicants have found that the adhesive materials incorporating these grafted components have improved compatibility with polar polymers such as EVA copolymers and exhibit good performance on difficult substrates, such as coated packaging surfaces.

SUMMARY

One embodiment of the present invention is a composition comprising an at least partially hydrogenated thermally polymerized aromatic-containing cycloaliphatic hydrocarbon resin grafted with a graft monomer, wherein the graft monomer resin weight ratio in the grafted resin is less than 1:1. The hydrocarbon resin prior to grafting preferably contains less than 1% olefinic protons. The composition may further comprise between 0.1 and 99 wt % grafted oligomers having monomer units selected from cyclopentadiene and substituted cyclopentadiene, $C_5$ monomers, and $C_9$ monomers. The composition may further comprise at least one other (ungrafted) resin and/or polyolefin. Other additives may also be included depending on the application.

Another embodiment of the present invention is a process comprising contacting a graft monomer with an at least partially hydrogenated thermally polymerized aromatic-containing cycloaliphatic hydrocarbon resin, preferably in the presence of a free-radical initiator. The hydrocarbon resin prior to grafting preferably contains less than 1% olefinic protons.

DETAILED DESCRIPTION

Grafted Hydrocarbon Resin

Figure 1:
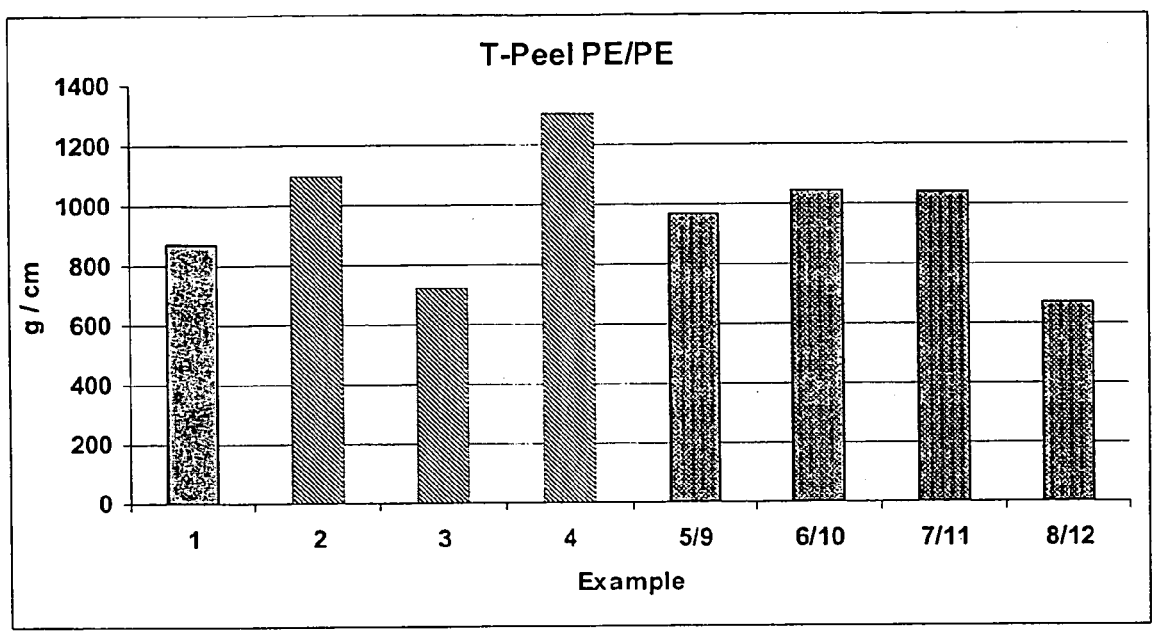
FIGS. 1–6 illustrate the comparative performance on polyethylene and PET substrates between hot melt adhesives containing grafted resins and hot melt adhesives containing other resin materials.
Figure 2:
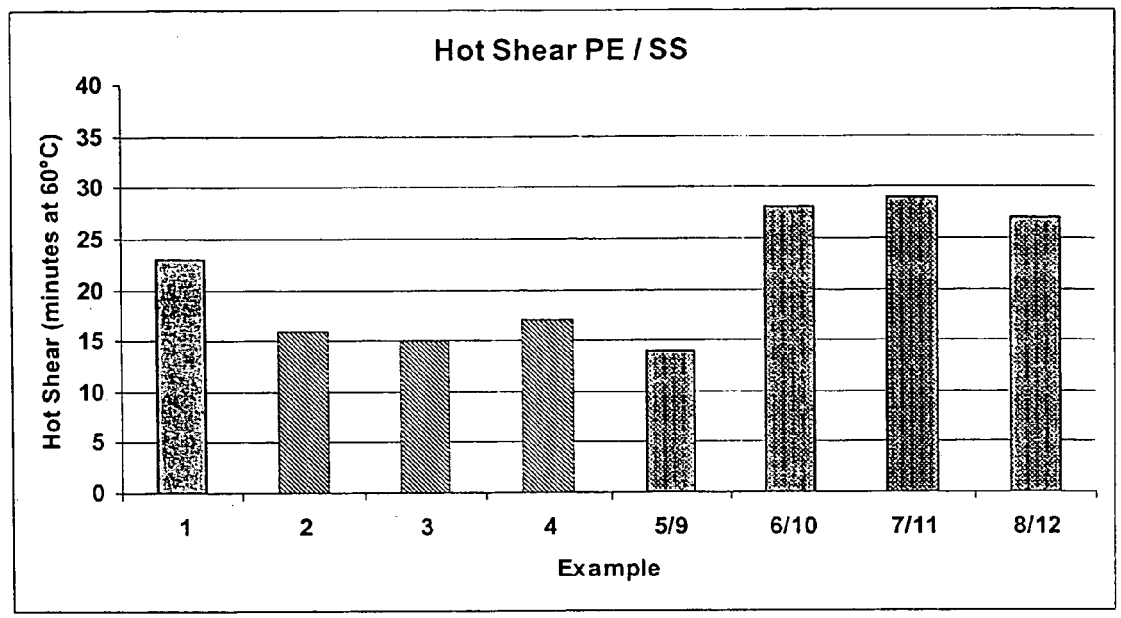
Figure 3:
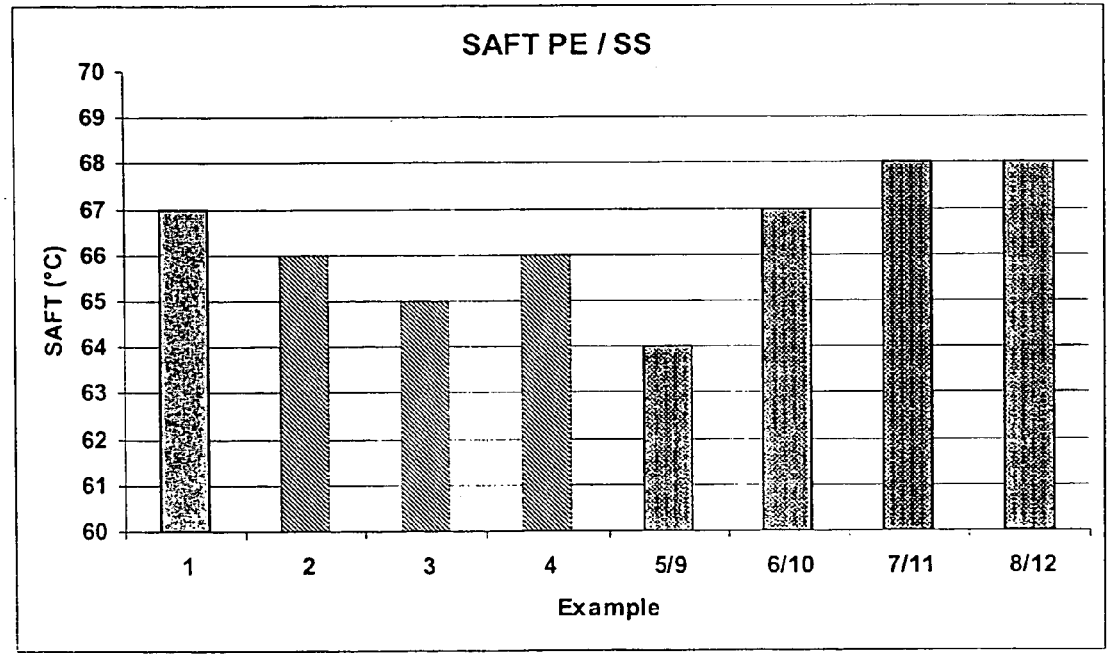
Figure 4:
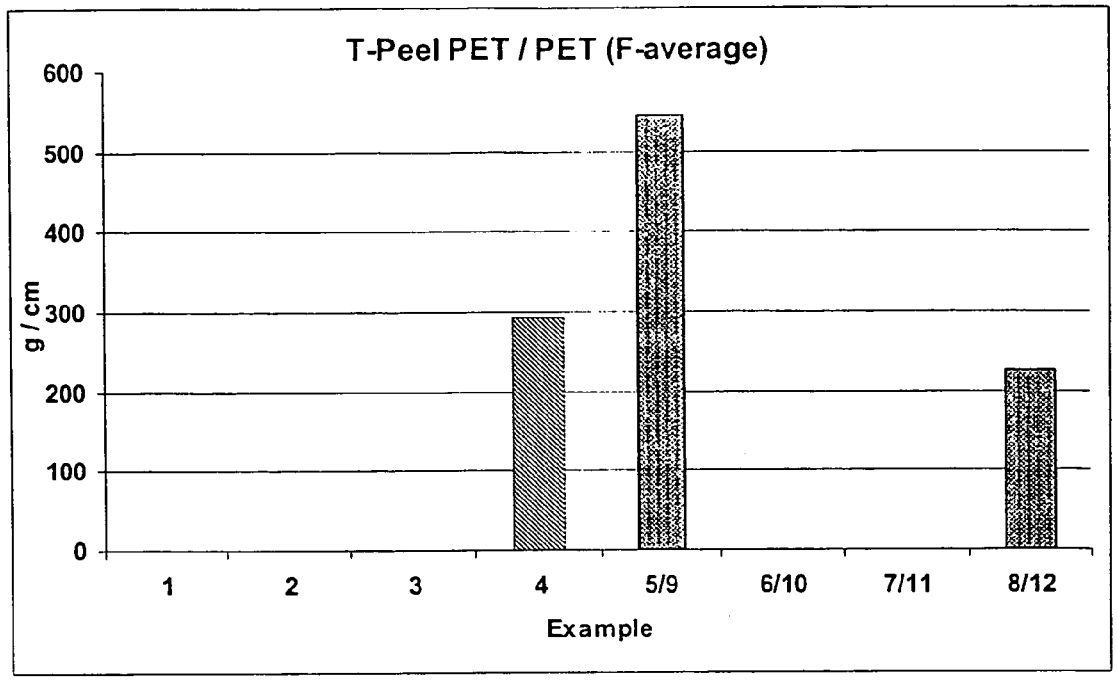
Figure 5:
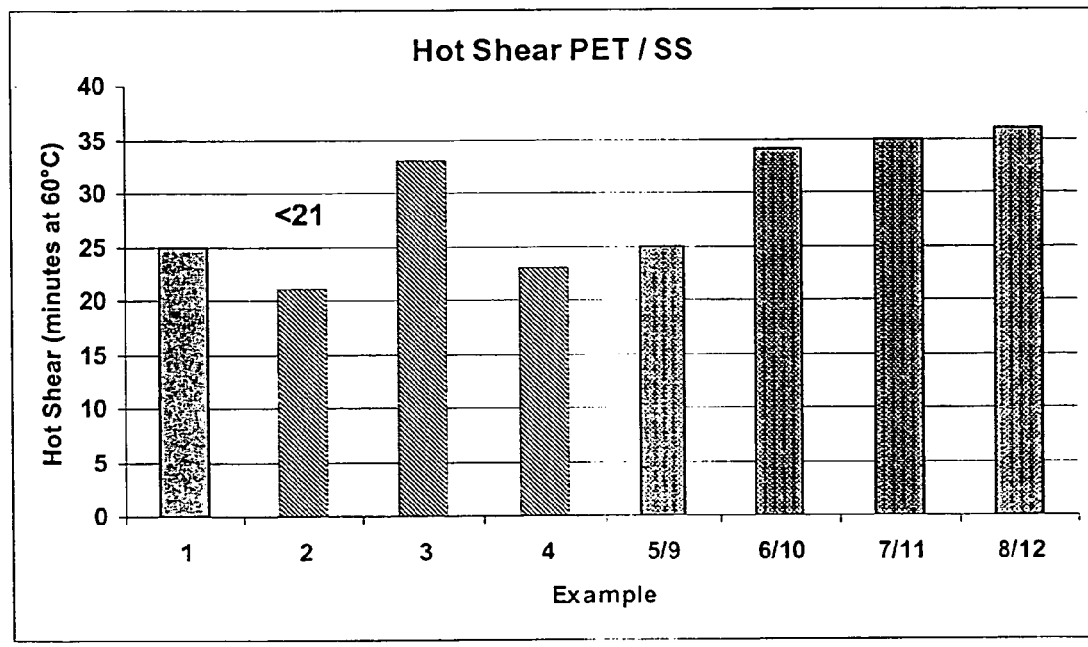
Figure 6:
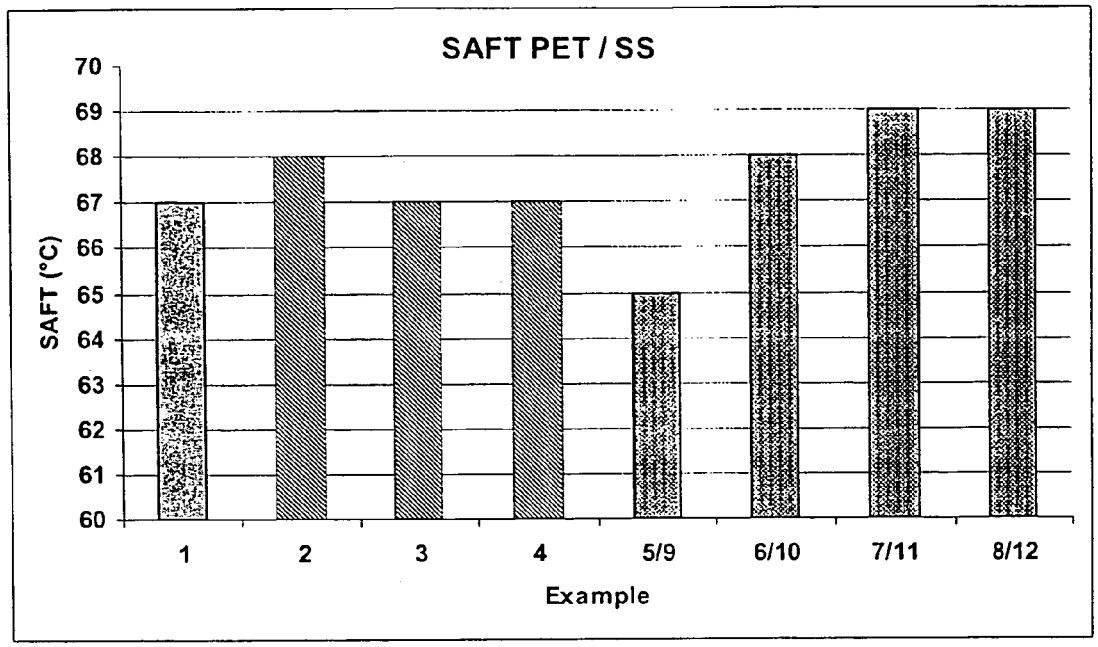
Figure 7:
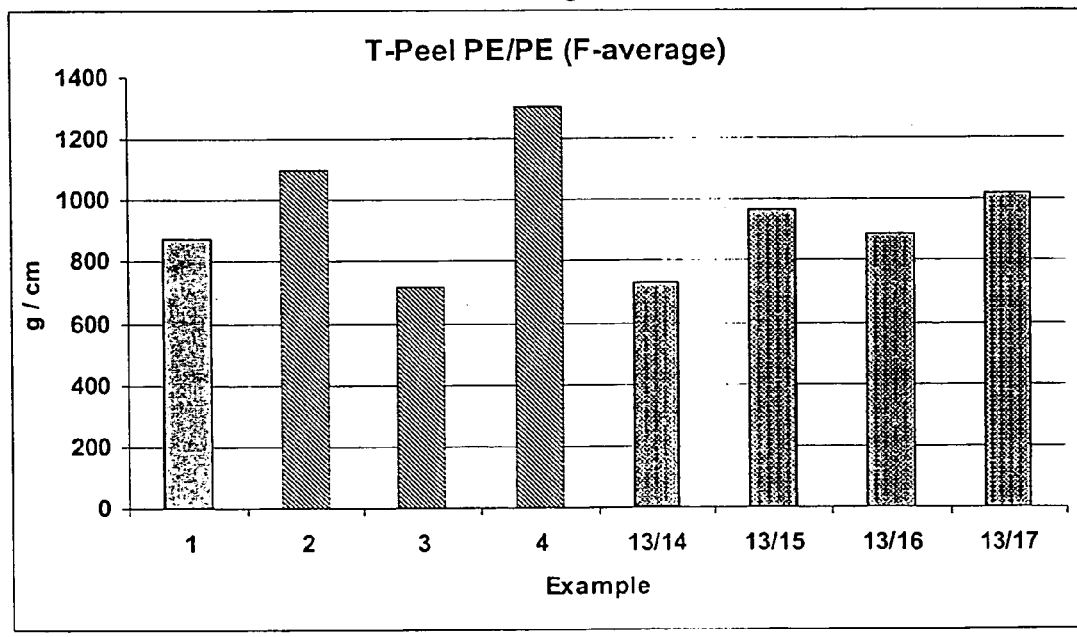
FIGS. 7–12 illustrate the comparative performance on polyethylene and PET substrates between hot melt adhesives containing resin material comprising grafted oligomers and hot melt adhesives containing other resin materials.
Figure 8:
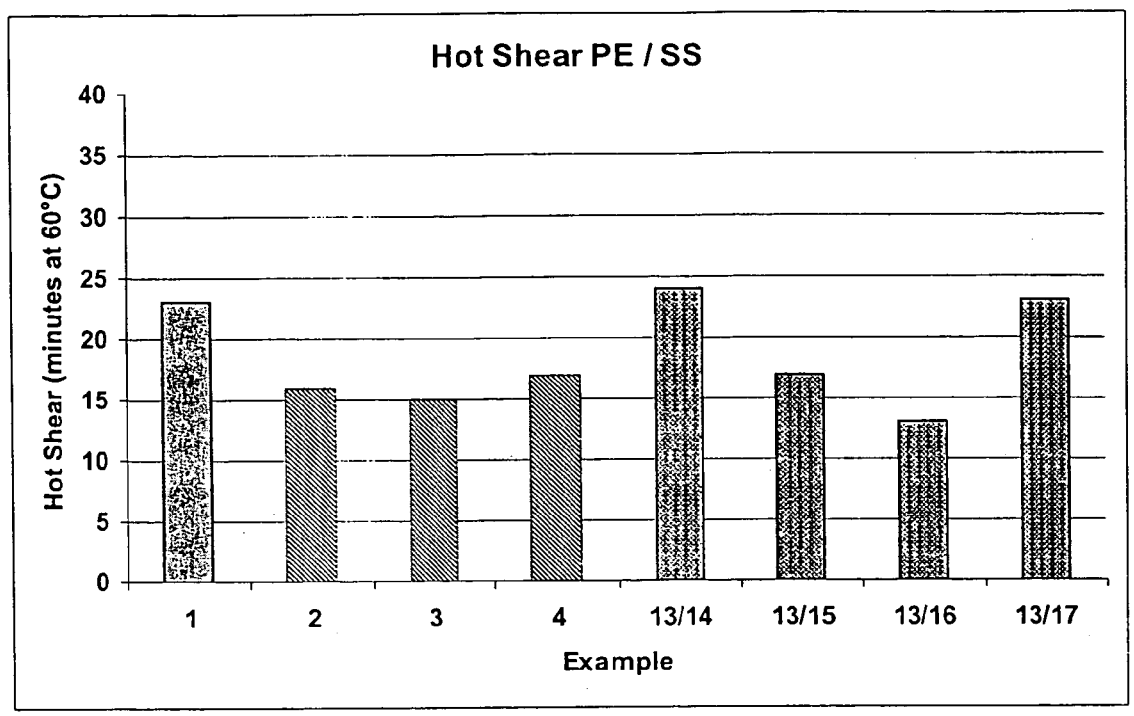
Figure 9:
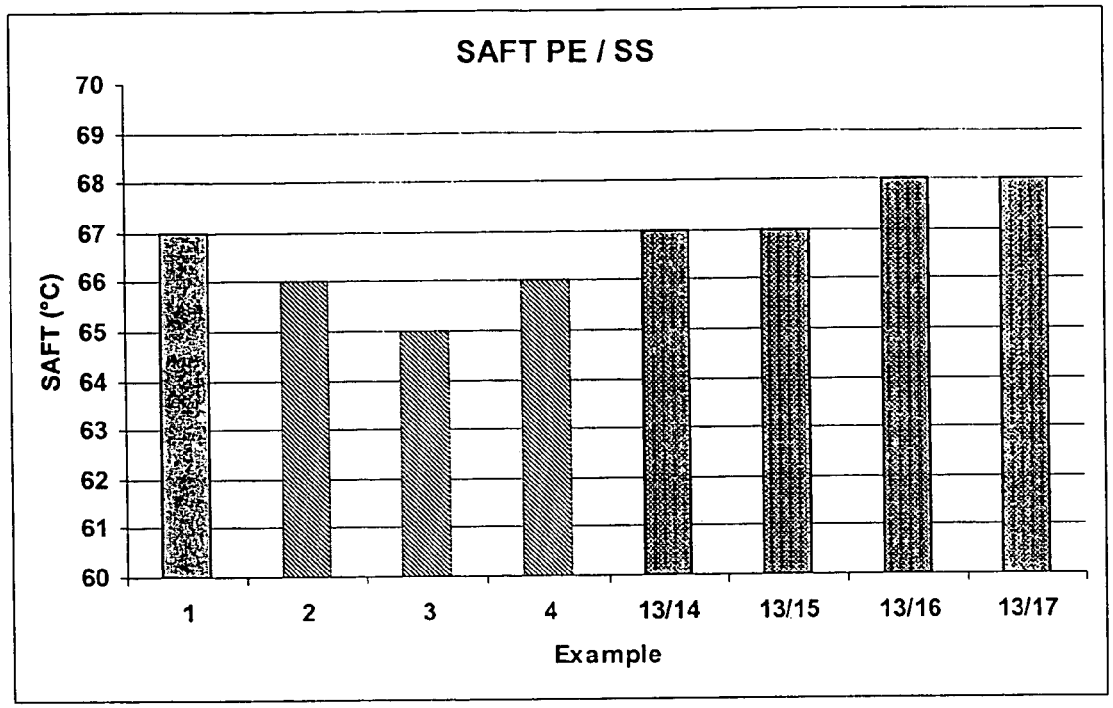
Figure 10:
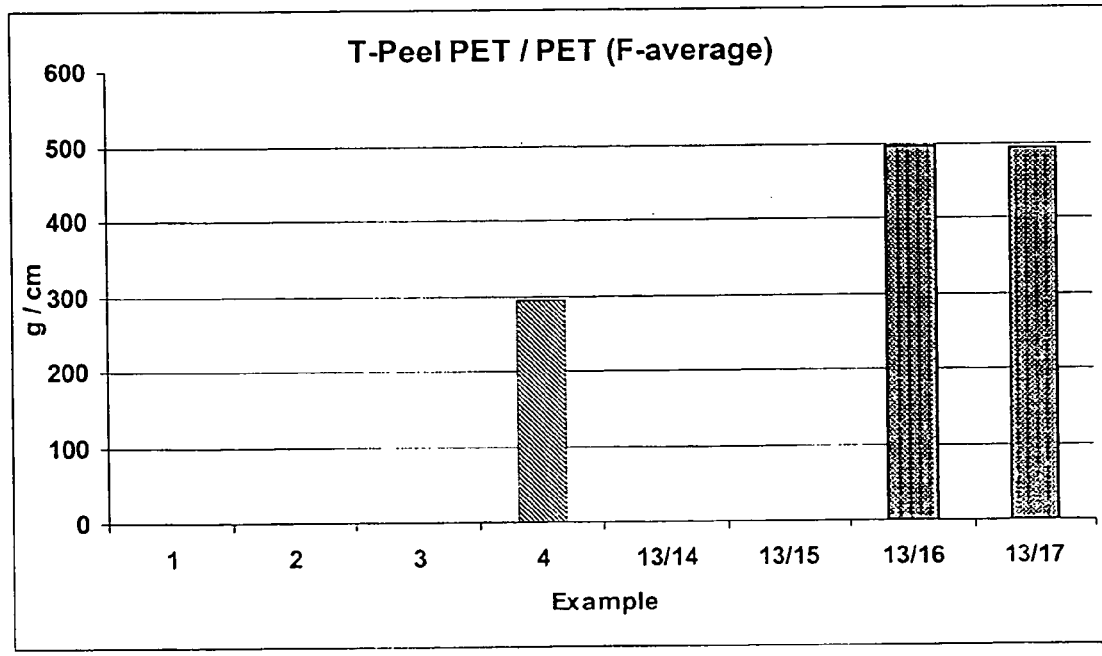
Figure 11:
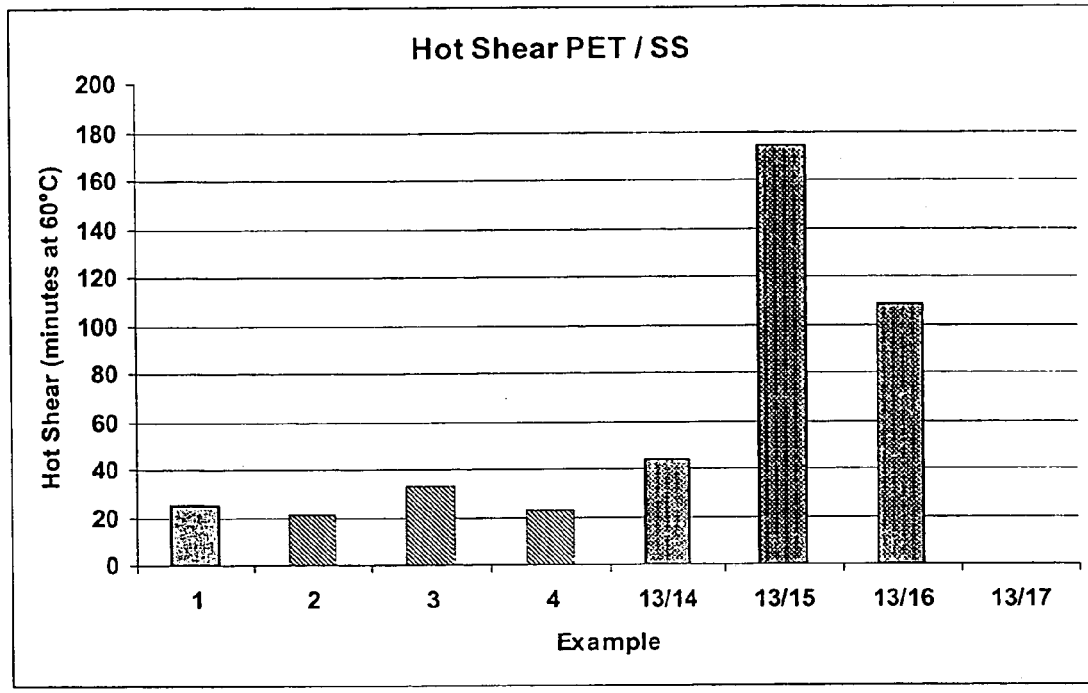
Figure 12:
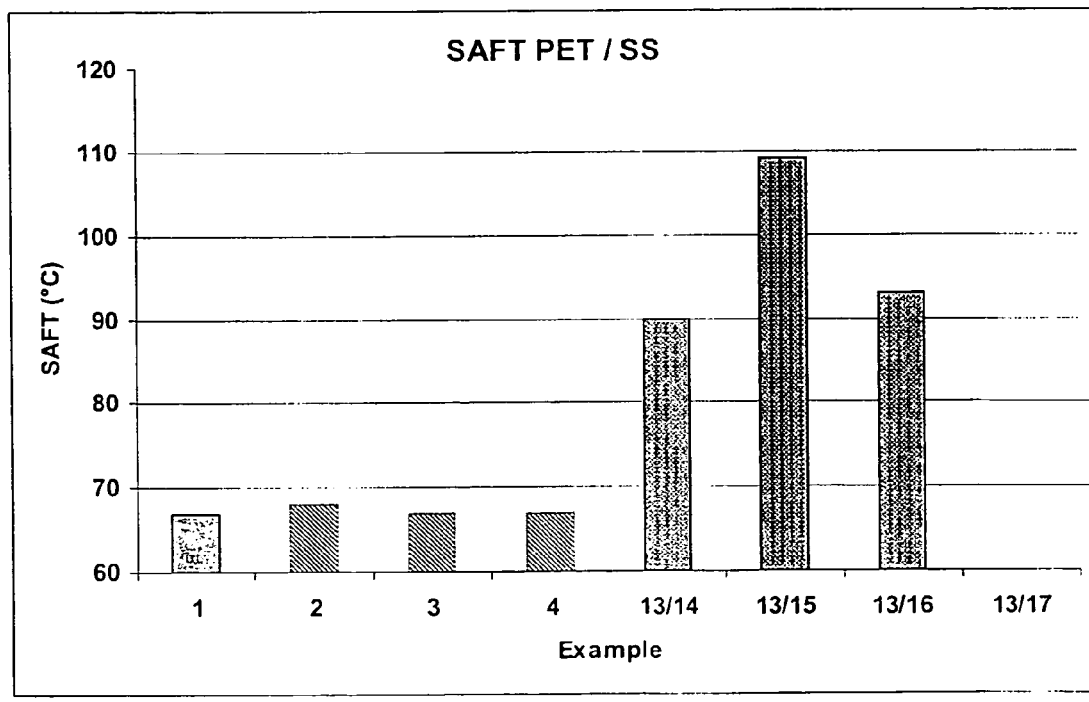

As used herein, a grafted hydrocarbon resin, oligomer, and/or resin material, or a combination thereof means it has been combined, contacted, and/or reacted with a graft monomer. Grafting is the process of combining, contacting, or reacting the hydrocarbon resin, oligomers and/or resin material with the graft monomer. Grafting hydrocarbon resins, oligomers, and/or resin material, or a combination thereof to include at least some polar functionality produces useful components for many applications such as adhesive formulations, especially HMA formulations. These formulations are often designed for use with polar polymers, such as EVAs, ethylene methyl acrylates (EMAs), polyacrylates (PAs), polymethacrylates (PMAs), ethylene alkyl acrylates and for use on polar substrates, such as PET, recycled paper, cardboard, and acrylic varnishes and work well on other substrates such as wood, glass, ceramic, asphalt, concrete, and metal.

Accordingly, embodiments of the present invention include grafted and ungrafted hydrocarbon resin(s) and oligomer(s) and combinations and mixtures thereof. Embodiments also include, but are not limited to: adhesives or adhesive components comprising (i) grafted hydrocarbon resins; (ii) grafted oligomers, (iii) grafted oligomers+ungrafted resin(s), (iv) grafted hydrocarbon resin+ungrafted resin(s), (v) grafted hydrocarbon resin+ungrafted oligomers, (vi) grafted hydrocarbon resin+grafted oligomers, (vii) grafted oligomers+ungrafted oligomers or (viii) grafted hydrocarbon resin+grafted oligomers+ungrafted resin(s) and other suitable combinations of one or more thereof. The embodiments described herein also include processes for making and using the previously described materials.

Suitable hydrocarbon resins that may be grafted include: aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, and mixtures of two or more thereof. Rosin esters may also be grafted. Preferably, the resin is at least partially hydrogenated, more preferably substantially hydrogenated, and more preferably comprises aromatic monomers.

In one embodiment, the resin comprises hydrocarbon resins produced by the thermal polymerization of dicyclopentadiene (DCPD) or substituted DCPD, which may further include aliphatic or aromatic monomers as described later. In a preferred embodiment hydrocarbon resins produced by the thermal polymerization of dicyclopentadiene (DCPD) or substituted DCPD and $C_9$ monomers contain less than 10% aromatics in the final resin product.

Grafted Oligomers

Another embodiment is a material comprising grafted oligomers (dimers, trimers, tetramers, pentamers, hexamers and optionally septamers and octamers), preferably derived from a petroleum distillate boiling in the range of 30–210° C. The oligomers can be derived from any suitable process and are often derived as a byproduct of resin polymerization, whether thermal or catalytic. The oligomers may be derived from processes wherein suitable DCPD, $C_5$ and/or $C_9$ monomer feeds (as described below) are oligomerized and then grafted. Suitable oligomer streams have molecular weights (Mn) between 130–500, more preferably between 130–410, more preferably between 130–350, more preferably between 130–270, more preferably between 200–350, and more preferably between 200–320.

In one embodiment the oligomers comprise cyclopentadiene and substituted cyclopentadiene monomers and may further comprise $C_9$ monomers. In another embodiment, the oligomers comprise $C_5$ monomers and may further comprise $C_9$ monomers. Other monomers may also be present, including $C_4$–$C_6$ mono- and di-olefins and terpenes. The oligomers may also comprise $C_9$ monomers alone. In each embodiment, it is preferred that the oligomers are at least partially hydrogenated, more preferably substantially hydrogenated before grafting with the graft monomer. Specific examples of suitable individual cyclopentadiene and substituted cyclopentadiene monomers (including DCPD), $C_9$ monomers and $C_5$ monomers are described below. Suitable oligomers may also comprise a mixture of more or more preferred oligomer materials as described herein.

In a preferred embodiment, the hydrocarbon resin/and or oligomers have an aromatic content of 1–60%, more preferably 1–40%, more preferably 1–20%, more preferably 1–15%, more preferably 10–20%, more preferably 15–20%, more preferably 1–10%, and more preferably 5–10%, wherein any upper limit and any lower limit of aromatic content may be combined for a preferred range of aromatic content. In one embodiment, the hydrocarbon resin to be grafted has a softening point of 10–200° C., more preferably 10–160° C., more preferably 60–130° C., more preferably 90–130° C., more preferably 80–120° C. more preferably 80–150° C., and more preferably 90–110° C., wherein any upper limit and any lower limit of softening point may be combined for a preferred softening point range. Softening point (° C.) is preferably measured as a ring and ball softening point according to ASTM E-28 (Revision 1996).

As used herein aromatic content and olefin content are measured by $^1$H-NMR as measured directly from the $^1$H NMR spectrum from a spectrometer with a field strength greater than 300 MHz, most preferably 400 MHz (frequency equivalent). Aromatic content is the integration of aromatic protons versus the total number of protons. Olefin proton or olefinic proton content is the integration of olefinic protons versus the total number of protons.

The resin and/or oligomers are preferably at least partially hydrogenated and more preferably substantially hydrogenated. As used herein at least partially hydrogenated means that the material contains less than 90% olefinic protons, more preferably less than 75% olefinic protons, more preferably less than 50% olefinic protons, more preferably less than 40% olefinic protons, more preferably less than 25% olefinic protons, more preferably less than 15% olefinic protons, more preferably less than 10% olefinic protons, more preferably less than 9% olefinic protons, more preferably less than 8% olefinic protons, more preferably less than 7% olefinic protons, and more preferably less than 6% olefinic protons. As used herein, substantially hydrogenated means that the material contains less than 5% olefinic protons, more preferably less than 4% olefinic protons, more preferably less than 3% olefinic protons, more preferably less than 2% olefinic protons, more preferably less than 1% olefinic protons, more preferably less than 0.5% olefinic protons, more preferably less than 0.1% olefinic protons, and more preferably less than 0.05% olefinic protons after hydrogenation (and before reaction with the raft monomer). The degree of hydrogenation is typically conducted so as to minimize and preferably avoid hydrogenation of the aromatic bonds. In preferred embodiments wherein the resin and/or oligomers are substantially hydrogenated, it is believed that the graft monomer is appended to the resin/oligomer backbone as opposed to forming a copolymer (of resin/oligomers and graft monomers) because of the lack of terminal olefinic bonds on the substantially hydrogenated resin/oligomers (as indicated by the preferred low olefinic proton measurements).

As stated, both the resins and oligomers preferably comprise one or more aromatic monomers. The data below suggests that an aromatic material yields better performance in adhesives comprising aromatic-containing graft material. Additionally, certain graft monomers, such as maleic anhydride, have good solubility in an aromatic-containing material, which probably allows for a more homogeneous reaction phase and likely avoids undesirable byproducts during the grafting reaction.

Graft Monomers

Preferred graft monomers include any unsaturated organic compound containing at least one olefinic bond and at least one polar group such as a carbonyl group, which includes unsaturated acids and anhydrides and derivatives thereof. Preferably, the organic compound contains an ethylenic unsaturation conjugated with a carbonyl group (—C=O) and preferably contains at least one α, β olefin bond. Examples include carboxylic acids, acid halides or anhydrides, phenols, alcohols (mono-alcohols, diols, and polyols), ethers, ketones, alkyl and aromatic amines (including polyamines), nitriles, imines, isocyanates, nitrogen compounds, halides and combinations and derivatives thereof. Representative acids and acid derivatives include carboxylic acids, anhydrides, acid halides, esters, amides, imides and their salts, both metallic and non-metallic. Examples include maleic, fumaric, acrylic, methacrylic, itaconic, aconitic, citraconic, himic, tetrahydrophthalic, crotonic, α-methyl crotonic, and cinnamic acids. Maleic anhydride is a particularly preferred graft monomer. Particular examples include, itaconic anhydride, citraconic anhydride, methyl acrylate, methyl methacrylate, ethyl acrylate, ethyl methacrylate, glycidyl acrylate, monoethyl maleate, diethyl maleate, dibutyl maleate, monomethyl fumarate, dimethyl fumarate, monomethyl itaconate, diethyl itaconate, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monobutylamide, fumaric acid-N,N-dibutylamide, maleimide, N-butylmaleimide, N-phenylmaleimide, sodium acrylate, sodium methacrylate, potassium acrylate and potassium methacrylate. Preferred graft monomers include acids, anhydrides, alcohols, amides, and imides.

Hydrocarbon Resin Production

Hydrocarbon resins are well known and are produced, for example, by Friedel-Crafts polymerisation of various feeds, which may be pure monomer feeds or refinery streams containing mixtures of various unsaturated materials. Generally speaking, the purer the feed the easier to polymerise. For example pure styrene, pure α-methyl styrene and mixtures thereof are easier to polymerise than a $C_8/C_9$ refinery stream. Similarly, pure or concentrated piperylene is easier to polymerise than $C_4$–$C_6$ refinery streams. These pure monomers are, however, more expensive to produce than the refinery streams which are often by-products of large volume refinery processes.

Aliphatic hydrocarbon resins can be prepared by cationic polymerisation of a cracked petroleum feed containing $C_4$, $C_5$, and $C_6$ paraffins, olefins, and conjugated diolefins referred to herein as $C_5$ monomers. As used herein, $C_5$ monomers preferably excludes DCPD monomer removed by thermal soaking as described below. These monomer streams comprise cationically and thermally polymerisable monomers such as butadiene, isobutylene, 1,3-pentadiene (piperylene) along with 1,4-pentadiene, cyclopentene, 1-pentene, 2-pentene, 2-methyl-1-pentene, 2-methyl-2-butene, 2-methyl-2-pentene, isoprene, cylcohexene, 1-3-hexadiene, 1-4-hexadiene, cyclopentadiene, and dicyclopentadiene. To obtain these $C_5$ monomer feeds the refinery streams are preferably purified usually by both fractionation and treatment to remove impurities. In some embodiments, the $C_5$ monomer feed stream may include at least some cyclopentadiene (CPD) and substituted cyclopentadiene (e.g, methylcyclopentadiene) components. These components are optionally separated from the $C_5$ monomer streams by thermal soaking wherein the $C_5$ monomer feed stream is heated to a temperature between 100° C. and 150° C. for 0.5 to 6 hours followed by separation of the DCPD monomers, to reduce the level of cyclopentadiene or dicyclopentadiene in the $C_5$ monomer stream to preferably below 2 wt %. Low temperature heat soaking is preferred in order to limit the cyclic diene (cyclopentadiene and methylcyclopentadiene) co-dimerisation with $C_5$ linear conjugated dienes (isoprene and pentadienes 1,3 cis- and trans-). The thermal soaking step preferably dimerizes the cyclopentadiene and substituted cyclopentadiene, making separation from the $C_5$ monomer stream easier. After fractionation and, if carried out, thermal soaking, the feedstock is preferably subjected to distillation to remove cyclic conjugated diolefins which are gel precursors (cyclopentadiene and methylcyclopentadiene being removed as dimers, trimers, etc.).

One example of a $C_5$ monomer stream is a steam cracked petroleum stream boiling in the range of –10° C. to 100° C. Examples of commercial samples of $C_5$ monomer feedstocks include Naphtha Petroleum 3 Piperylenes from Lyondell Petrochemical Company, Houston, Tex., regular Piperylene Concentrate or Super Piperylene Concentrate both from Shell Nederland Chemie B.V., Hoogvilet, the Netherlands.

The resin polymerization feed may also comprise $C_8$–$C_{10}$ aromatic monomers (referred to herein as $C_9$ monomers) such as styrene, indene, derivatives of styrene, derivatives of indene, and combinations thereof. Particularly preferred aromatic olefins include styrene, α-methylstyrene, β-methylstyrene, indene, methylindenes and vinyl toluenes. One example of a $C_9$ monomer stream is a steam cracked petroleum stream boiling in the range of –10° C. to 210° C. (135° C. to 210° C. if the $C_5$ monomers and DCPD components are not present). Examples of commercial $C_9$ monomer feedstocks include LRO-90 from Lyondell Petrochemical Company, Houston, Tex., DSM $C_9$ Resinfeed Classic from DSM, Geleen, the Netherlands, RO-60 and RO-80 from Dow Chemical Company of Midland, Mich., and Dow Resin Oil 60-L from the Dow Chemical Company of Temeuzen, the Netherlands.

In addition to the reactive components, non-polymerisable components in the feed may include saturated hydrocarbons such as pentane, cyclopentane, or 2-methyl pentane that can be co-distilled with the unsaturated components. This monomer feed can be co-polymerised with other $C_4$ or $C_5$ olefins or dimers. Preferably, however, the feeds are purified to remove unsaturated materials that adversely affect the polymerisation reaction or cause undesirable colours in the final resin (e.g., isoprene). This is generally accomplished by fractionation. In one embodiment, polymerization is conducted using Friedel-Crafts polymerisation catalysts such as supported or unsupported Lewis acids (e.g., boron trifluoride ($BF_3$), complexes of boron trifluoride, aluminium trichloride ($AlCl_3$), complexes of aluminium trichloride or alkyl aluminium halides, particularly chlorides). Suitable reaction conditions for Friedel-Crafts polymerisation include temperatures of –20° C. to 100° C., pressures of 100 to 2000 k Pa. In one embodiment, $C_5$ and $C_9$ monomers are polymerized by such a process.

Typically, the feed stream includes between 20–80 wt % monomers and 20–80 wt % solvent. Preferably, the feed stream includes 30–70 wt % monomers and 30–70 wt % of solvent. More preferably, the feed stream includes 50–70 wt % monomers and 30–50 wt % of solvent. The solvent may include an aromatic solvent, which may be toluenes, xylenes, other aromatic solvents, aliphatic solvents and/or mixtures of two or more thereof. The solvent is preferably recycled. The solvent may comprise, the unpolymerisable component of the feed. The solvents generally contain less than 250 ppm water, preferably less than 100 ppm water, and most preferably less than 50 ppm water.

In another embodiment, the feed stream includes 30–95 wt % of $C_5$ monomers, as described above and 5–70 wt % of a co-feed including at least one member selected from the group consisting of pure monomer, $C_9$ monomers, and terpenes. Preferably, the feed stream includes about 50–85 wt % of $C_5$ monomers and about 15–50 wt % of a co-feed, including at least one member selected from the group consisting of pure monomer, $C_9$ monomers, and terpenes.

Typically, the resulting hydrocarbon resin has a number average molecular weight (Mn) of 400–3000, a weight average molecular weight (Mw) of 500–6000, a z-average molecular weight (Mz) of 700–15,000 and a polydispersity (PD) as measured by Mw/Mn between 1.5 and 4. As used herein, molecular weights (number-average molecular weight (Mn), weight-average molecular weight (Mw), and z-average molecular weight (Mz)) are measured by Size Exclusion Chromatography using a Waters 150 Gel Permeation Chromatograph equipped with a differential refractive index detector and calibrated using polystyrene standards. Samples are run in tetrahydrofuran (THF) (45° C.). Molecular weights are reported as polystyrene-equivalent molecular weights and are generally measured in g/mol.

The monomer feed can be co-polymerised with $C_4$ or $C_5$ olefins or their olefinic dimers as chain transfer agents. Up to 40 wt %, preferably up to 20 wt %, of chain transfer agents may be added to obtain resins with lower and narrower molecular weight distributions than can be prepared from using the monomer feed alone. Chain transfer agents stop the propagation of a growing polymer chain by terminating the chain in a way, which regenerates a polymer initiation site. Components, which behave as chain transfer agents in these reactions include but are not limited to, 2-methyl-1-butene, 2-methyl-2-butene or dimers or oligomers of these species. The chain transfer agent can be added to the reaction in pure form or diluted in a solvent.

A DCPD resin and/or oligomers thereof (referred to also as CPD oligomers) may be obtained by thermal polymerisation of a feed comprising unsaturated monomers of DCPD and/or substituted DCPD. In one embodiment, the feed also comprises aromatic monomers as previously described. In such embodiments, a mixture of (a) DCPD stream, preferably a steam cracked petroleum distillate boiling in the range 80–200° C., more preferably 140° C. to 200° C., containing dimers and codimers of cyclopentadiene and its methyl derivatives together with (b) $C_9$ monomers, preferably a steam cracked distillate boiling in the range 150–200° C. comprising α-methyl styrene, vinyl toluenes, indene and methyl indene with other $C_9$ and $C_{10}$ aromatics, in the weight ratio (a:b) between 90:10 to 50:50 is heated in a batch polymerization reactor to 160–320° C. at a pressure of 980 kPa to 2000 kPa (more preferably $9.8\times10^5$–$11.7\times10^5$ Pa), for 1.2 to 4 hours, more preferably 1.5 to 4 hrs. Where inclusion of the oligomers is not desired, the resulting polymerizate may steam stripped to remove inert, unreacted, and low molecular weight oligomeric components to yield a resin having a softening point in the range 80–120° C.

In one embodiment, the resin is preferably obtained by or derived from thermal polymerisation of a feed comprising $C_5$ monomers and $C_9$ monomers as previously described. In such embodiments, a mixture of (a) $C_5$ monomers, preferably, a steam cracked petroleum distillate boiling in the range 80–200° C. containing $C_5$ monomers together with (b) $C_9$ monomers, preferably a steam cracked distillate boiling in the range 150–200° C. comprising α-methyl styrene, vinyl toluenes, indene and methyl indene with other $C_8$-$C_{10}$ aromatics, in the weight ratio (a:b) between 90:10 to 50:50 is heated in a batch polymerization reactor to 160–320° C. at a pressure of 980 kPa to 2000 kPa (more preferably $9.8\times10^5$–$11.7\times10^5$ Pa), for 1.2 to 4 hours, more preferably 1.5 to 4 hrs. Where inclusion of the oligomers is not desired, the resulting polymerizate may be steam stripped to remove inert, unreacted, and low molecular weight oligomeric components to yield a resin having a softening point in the range 80–120° C.

The products of the polymerization process include both resin and an oligomer by-product comprising oligomers (dimers, trimers, tetramers, pentamers, and hexamers, and optionally septamers and octamers) of the feed monomer(s). As used hereafter, resin material refers to the resin, the oligomers, or a mixture of the two. In an embodiment where the oligomer by-product results from thermal polymerization of DCPD and substituted DCPD, the oligomers are typically a complex mixture of (preferably hydrogenated as described below) Diels Alder trimers and tetramers of CPD and methyl-CPD with low levels of acyclic $C_5$ diolefins such as pentadiene-1,3 and isoprene.

The resin material is then preferably hydrogenated to reduce coloration and improve colour stability. Any of the known processes for catalytically hydrogenating resin material can be used. In particular the processes disclosed in U.S. Pat. No. 5,171,793, U.S. Pat. No. 4,629,766, U.S. Pat. No. 5,502,104 and U.S. Pat. No. 4,328,090 and WO 95/12623 are suitable. Generic hydrogenation treating conditions include reactions in the temperature range of about 100–350° C. and pressures of between 5 atm (506 kPa) and 300 atm (30390 kPa) hydrogen (and even up to 400 atm hydrogen), for example, 10–275 atm (1013–27579 kPa). In one embodiment the temperature is in the range including 180–330° C. and the pressure is in the range including 15195–20260 kPa hydrogen. The hydrogen to feed volume ratio to the reactor under standard conditions (25° C., 1 atm (101 kPa) pressure) typically can range from 20:1–200:1; for water-white resins 100:1–200:1 is preferred. The hydrogenated product may be stripped to remove low molecular weight by-products and any solvent. This oligomeric by-product is a low-viscosity nearly colorless liquid boiling between 250–400° C. and is preferably substantially hydrogenated.

The hydrogenation of the resin material may be carried out via molten or solution based processes by either a batch wise or, more commonly, a continuous process. Catalysts employed for the hydrogenation of hydrocarbon resins are typically supported monometallic and bimetallic catalyst systems based on group 6, 8, 9, 10 or 11 elements. Catalysts such as nickel on a support (for example, nickel on alumina, nickel on charcoal, nickel on silica, nickel on kieselguhr, etc), palladium on a support (for example, palladium on silica, palladium on charcoal, palladium on magnesium oxide, etc) and copper and/or zinc on a support (for example copper chromite on copper and/or manganese oxide, copper and zinc on alumina, etc) are good hydrogenation catalysts. The support material is typically comprised of such porous inorganic refractory oxides as silica, magnesia, silica-magnesia, zirconia, silica-zirconia, titania, silica-titania, alumina, silica-alumina, alumina-silicate, etc, with supports containing γ-alumina being highly preferred. Preferably, the supports are essentially free of crystalline molecular sieve materials. Mixtures of the foregoing oxides are also contemplated, especially when prepared as homogeneously as possible. Useful support materials include those disclosed in the U.S. Pat. Nos. 4,686,030, 4,846,961, 4,500,424, and 4,849,093. Suitable supports include alumina, silica, carbon, MgO, $TiO_2$, $ZrO_2$, $Fe_2O_3$ or mixtures thereof.

Another suitable process for hydrogenating the resin material is described in EP 0082726. EP 0082726 describes a process for the catalytic or thermal hydrogenation using a nickel-tungsten catalyst on a gamma-alumina support wherein the hydrogen pressure is $1.47 \times 10^7 – 1.96 \times 10^7$ Pa and the temperature is in the range of 250–330° C. After hydrogenation the reactor mixture may be flashed and further separated to recover hydrogenated resin material. In one embodiment, steam distillation may be used to separate the oligomers and is preferably conducted without exceeding 325° C. resin temperature.

In one embodiment, the catalyst comprises nickel and/or cobalt with one or more of molybdenum and/or tungsten on one or more of alumina or silica supports wherein the amount of nickel oxide and/or cobalt oxide on the support ranges from 2–10 wt %. The amount of tungsten or molybdenum oxide on the support after preparation ranges from 5–25 wt %. Preferably, the catalyst contains 4–7 wt % nickel oxide and 18–22 wt % tungsten oxide. This process and suitable catalysts are described in greater detail in U.S. Pat. No. 5,820,749. In another embodiment, the hydrogenation may be carried out using the process and catalysts described in U.S. Pat. No. 4,629,766. In particular, nickel-tungsten catalysts on gamma-alumina are preferred.

In one embodiment, the oligomers are stripped from the resin before hydrogenation. In such an embodiment, the oligomers are preferably hydrogenated before grafting. In another embodiment, the oligomers are hydrogenated with the resin and then stripped from the resin, yielding a hydrogenated resin and hydrogenated oligomers. In another embodiment, at least some of the oligomers are stripped before hydrogenation and at least some hydrogenated oligomers are stripped after hydrogenation. In yet another embodiment, the hydrogenated resin/oligomers product may be further processed together as a single mixture as described below. In yet another embodiment, the oligomers can be derived from any suitable source and hydrogenated (if necessary) before grafting so that the oligomers before grafting are typically at least partially hydrogenated and preferably substantially hydrogenated.

Grafting the Resin Material

At least a portion of the resulting resin material, preferably derived from a process such as that described above, may then be combined and/or contacted with a graft monomer, typically under suitable reaction conditions and in a suitable mixing device. In a preferred embodiment, the reaction is conducted in the absence of significant shear. In accordance with the previously described embodiments, the resin and oligomers may be grafted separately or simultaneously, and if separately, grafted oligomers may then be optionally remixed with the grafted resin, an ungrafted resin, or any another suitable resin, adhesive component or composition as described below.

Grafting of the graft monomer preferably occurs in the presence of a free-radical initiator selected from the group consisting of organic peroxides, organic per-esters, and azo compounds. Examples of such compounds include benzoyl peroxide, dichlorobenzoyl peroxide, dicumyl peroxide, di-tert-butyl peroxide, 2,5-dimethyl-2,5-di(peroxybenzoate) hexyne-3,1,4-bis(tert-butylperoxyisopropyl)benzene, lauroyl peroxide, tert-butyl peracetate, 2,5-dimethyl-2,5-di(tert-butylperoxy)hexyne-3,2,5-dimethyl-2,5-di(tert-butylperoxy)hexane, tert-butyl perbenzoate, tert-butylperphenyl acetate, tert-butyl perisobutyrate, tert-butyl per-sec-octoate, tert-butyl perpivalate, cumyl perpivalate, tert-butyl hydroperoxide, tert-butyl perdiethylacetate azoisobutyronitrile, and dimethyl azoisobtityrate. The peroxide preferably has a half-life of about 6 minutes at 160° C. with volatile non-aromatic decomposition products and those that minimize color formation. Preferred peroxides include di-tert-butyl peroxide and 2,5 dimethyl-2,3-di(tert-butylperoxy)hexane. The amount of peroxide combined is typically dependent on the weight of the graft monomer. In one embodiment, the weight ratio of the graft monomer: peroxide in the reaction mixture may be between 1 and 20, more preferably between about 1 and 10, more preferably between about 1 and about 5, and even more preferably about 4.

The graft monomers may be combined with the resin material at a temperature between 50–200° C., more preferably between 70–150° C., more preferably between 70–125° C., more preferably between 140–180° C., more preferably between 140–180° C., more preferably between 155–165° C. or between 165–175° C. and a pressure of typically one atmosphere but higher pressures can be used if necessary. In another preferred embodiment, the grafting reaction occurs at temperature greater than 90° C., more preferably between 90° C. and any temperature limit described above, more preferably between 90° C. and 150° C., more preferably between 90° C. and 145° C. In general, the lower limit of the reaction temperature is governed by the softening point of the resin as it is preferred to conduct the grafting reactions at temperatures above the softening point of the material to be grafted.

The graft monomer may be combined so that the weight ratio of graft monomer:resin material in the reaction mixture is less than 1, more preferably less than 0.5 more preferably less than 3:10 and more preferably less than 3:20. In a preferred embodiment, the reaction mixture is maintained in a homogenous state. The reaction mixture is preferably agitated or stirred vigorously. The free radical initiator is combined with the resin material-graft monomer reaction mixture either in one addition or preferably in a continuous or semi continuous mode during the reaction. Residence time in the reaction zone is preferably less than 75 minutes, more preferably less than 60 minutes, more preferably between 10–60 minutes, even more preferably between 30–60 minutes.

In embodiments where only the oligomers are grafted, the reaction temperature is preferably between 50–200° C., more preferably between 70–150° C., more preferably between 70–125° C., more preferably between 140–180° C., more preferably between 140–180° C. more preferably between 155–165° C., and more preferably about 160° C. In another embodiment the reaction temperature is 170–185° C. In another preferred embodiment, the grafting reaction occurs at temperature greater than 90° C., more preferably between 90° C. and any temperature limit described above, more preferably between 90° C. and 150° C., more preferably between 90° C. and 145° C. Other preferred ranges may include between any upper and lower temperature described in this paragraph.

The amount of graft monomer added is typically dependent on the amount of oligomer. Preferably, the oligomer:graft monomer mole ratio is between 5 and 0.2, more preferably between 2 and 0.5, more preferably between about 1.5 and 0.67 and more preferably about 1. Thereafter, the ungrafted oligomers are stripped from the product and optionally recycled to the reaction zone. The grafted oligomers produced generally have a softening point between 0–120° C., more preferably between 25–120° C., more preferably between 50–120° C. and even more preferably between 80–110° C. and color of 4–10 Gardner. Gardner color, as used herein, is measured using ASTM D-6166. The grafted oligomer product can then be recombined with the resin (grafted or ungrafted) from which it was derived or combined with other resins, polymers, and/or other materials and formulated into and adhesive material.

In embodiments where only the resin is grafted, the reaction temperature is preferably between 50–200° C., more preferably between 70–150° C., more preferably between 70–125° C., more preferably between 140–180° C., more preferably between 140–180° C., more preferably between 165–175° C., and more preferably about 170° C. In another embodiment, the grafting reaction preferably occurs between 170–185° C. In another preferred embodiment, the grafting reaction occurs at temperature greater than 90° C., more preferably between 90° C. and any upper temperature limit described above. The amount of graft monomer added is typically dependent on the amount of resin. The graft monomer:resin weight ratio in the reaction mixture is preferably less than 1:5, more preferably less than 1:10, more preferably less than 1:20, and even more preferably about 1:40. Generally, the grafting raises the softening point of the resin less than 10° C., more preferably less than 5° C. and produces a grafted resin having a color between 1–6 Gardner.

In another embodiment, the oligomers are not stripped from the resin product, and the resin and oligomers are simultaneously grafted. Reaction conditions are similar to those previously described for grafting the resin, but the graft monomer:resin material weight ratio is generally kept below 0.5, more preferably below 0.25 and more preferably below 3:20. Upon completion of grafting, the material may be further stripped if required to yield a resin of the desired softening point and/or to remove unreacted oligomers. Separation of the grafted oligomers from the grafted resin may also be made if desired, but the product may be used without such further processing. In many embodiments comprising grafted resin and grafted oligomers, the weight ratio of grafted oligomers:grafted resin in the resin material will be greater than 0.005, more preferably greater than 0.01, more preferably greater than 0.02, more preferably greater than 0.05, and more preferably greater than 0.1.

Grafting of the resin material can also be conducted via a solution route wherein the resin material dispersed in a solvent and combined, contacted and/or reacted with the graft monomer. Additionally or alternatively, the graft monomer can be dispersed in a solvent prior to adding to the resin material. These routes allow for lower reaction temperatures (as low as 80° C. or 100° C.) and allows the choice of different peroxides having half-lives of 6 minutes at the lower reaction temperatures. Suitable solvents include, but are not limited to, aliphatic solvents, cycloaliphatic solvents, aromatic solvents, and aromatic-aliphatic solvents. Typical examples include benzene, toluene, xylene, chlorobenzene, n-pentane, n-hexane, n-heptane, n-octane, n-decane, iso-heptane, iso-decane, iso-octane, cyclohexane, alkyl cyclohexane, and combinations of two or more thereof.

It is believed that the graft monomer is grafted to the resin material through an olefinic bond of the graft monomer such as an $\alpha$, $\beta$ olefinic bond. It is believed that by grafting the oligomers via this route, the formation of norbornyl ester groups in the grafted resin material is minimized and preferably avoided. Thus, the resulting grafted resin material is substantially free of norbornyl ester groups, i.e., it preferably contains less than 0.5 wt % norbornyl ester groups, more preferably less than 0.1 wt %, more preferably less than 0.05 wt %, more preferably less than 0.01 wt %. The resulting grafted oligomers and/or grafted resin are preferably at least one of a (i) a mono-alkyl succinic acid, anhydride or derivative thereof, or (ii) a $\beta$-alkyl substituted propanoic acid or derivative thereof. The reaction product of the resin material and graft monomer or the product of the combination of the resin material and the graft monomer may also include some oligomers of the graft monomer, which may or may not be removed before formulating a final composition.

The resulting grafted resin material preferably has a softening point between 15–210° C., more preferably 15–170° C., more preferably 65–140° C., more preferably 65–130° C., more preferably 80–120° C., more preferably 90–110° C., and more preferably between about 85–110° C. The grafted resin material preferably has a glass transition temperature (Tg) less than 120° C., more preferably less than 110° C., more preferably between 25–100° C., more preferably between 60–100° C., more preferably 60–80° C., and more preferably between 35–70° C. Differential Scanning Calorimetry (DSC, ASTM D 341-88) was used to measure Tg. The resulting grafted resin material preferably has a Saponification number (mg KOH/g resin material) greater than 10, more preferably greater than 12, more preferably greater than 15, more preferably greater than 16, more preferably greater than 17, more preferably greater than 18, more preferably greater than 19, more preferably greater than 20, more preferably greater than 25. The resulting grafted resin material preferably has an acid number greater than 10, more preferably greater than 15, more preferably greater than 16, more preferably greater than 17, more preferably greater than 18, more preferably greater than 19, more preferably greater than 20, and more preferably greater than 25.

In one embodiment, the grafted resin material has an resin material:graft monomer molar ratio between 50 and 0.5, more preferably between 10 and 2, more preferably between 5 and 2, more preferably between 1.5 and 0.67, and more preferably about 1. In some embodiments, the weight ratio of graft monomer:resin in a grafted resin product is preferably less than 1, in other embodiments between 0.001 and 1, in other embodiments between 0.01 and 1, in other embodiments between 0.02 and 1, in other embodiments between 0.1 and 1, in other embodiments between 0.33 and 1, and in other embodiments between 0.01 and 0.3, and in other embodiments between 0.1 and 0.2.

Resin Blends

Resin blends comprising the grafted resin material described herein include both: (i) partially grafted resin material streams wherein only a portion of the resin material in a particular stream is grafted (resulting in a mixture of grafted an un-grafted resin material); and, (ii) blends of partially or fully grafted resin material streams with another tackifying resin. Suitable examples of other tackifying resins include: aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, aromatic hydrocarbon resins, at least partially hydrogenated aromatic hydrocarbon resins, polyterpene resins, terpene-phenol resins, rosin esters, rosin acids, resins grafted with graft monomers, and mixtures of any two or more thereof. Suitable resins also include other resins having polar functionality whether produced by processes described herein or other suitable processes.

For example, one embodiment is a composition comprising between 0.1–99 wt % grafted resin material and between 1–99.9 wt % other resin. Other embodiments comprise between 0.1–50 wt % grafted resin material, between 0.1–30 wt % grafted resin material, between 0.1–20 wt % grafted resin material, between 1–25 wt % grafted resin material, between 1–15 wt % grafted resin material, between 1–10 wt % grafted resin material, between 5–10 wt % grafted resin material, and between 10–30 wt % grafted resin material.

In a preferred embodiment, the resin material comprises grafted resin and grafted oligomers in embodiments of between 0.1 and 50 wt % grafted oligomers, more preferably between 0.1 and 30 wt % grafted oligomers, more preferably between 0.1 and 20 wt % grafted oligomer, more preferably 0.1 and 10 wt % grafted oligomers, more preferably between 1 and 30 wt % grafted oligomers, more preferably between 1 and 20 wt % grafted oligomers, and more preferably between 1 and 10 wt % grafted oligomers based on the total weight of the resin material. Preferred ranges also include between any upper and lower limit described in this paragraph.

One embodiment is a composition comprising at least two hydrocarbon resins, wherein at least one of the resins is a grafted resin material grafted with a graft monomer and the other resin is an ungrafted petroleum hydrocarbon resin. "At least two hydrocarbon resins" also includes embodiments of hydrocarbon resins wherein only a portion of the overall resin molecules have been grafted with a graft monomer. While the base resin component may be the same, there are two resins—one grafted and one un-grafted resin within the resin composition. Such an embodiment may include at least two hydrocarbon resins wherein the base resin components are different, e.g. a $C_8/C_9$ resin and a grafted $CPD/C_9$ resin. Other examples include any combination of ungrafted resins and grafted resin materials described herein. For example, suitable petroleum hydrocarbon resins include: aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, aromatic hydrocarbon resins, at least partially hydrogenated aromatic hydrocarbon resins, polyterpene resins, terpene-phenol resins. Evaluation of a resin mixture to determine its graft monomer species can be conducted, and FTIR (Fourier Transform Infrared) analysis is a preferred method to determine the type of graft monomer present in the resin mixture.

The graft monomers may include any of those mentioned later, but preferred graft monomers include alcohols, acids, imides, amides and anhydrides, and derivatives thereof and the molar ratio of graft monomers to the resins (including both the grafted resin and un-grafted petroleum hydrocarbon resin) is preferably is preferably less than 1.33, more preferably between 0.001 and 1.66, more preferably between 0.001 and 1.33 more preferably between 0.001 and 1.25 more preferably between 0.001 and 1.2, more preferably between 0.001 and 1.1, more preferably between 0.01 and 1, more preferably between 0.02 and 1, more preferably between 0.33 and 1, and in another embodiment preferably between 0.01 and 0.33. In particular embodiments, the graft monomer is an acid or an anhydride, and the molar ratio of graft monomers to the at least two hydrocarbon resins in the resin mixture is between 1:4 and 1:20. In another embodiment, the graft monomer is an alcohol, and the molar ratio of graft monomers to the at least two hydrocarbon resins in the resulting mixture is between 5:3 and 1:20, more preferably 1:1 to 1:15 and more preferably 2:3 to 1:10. Preferred weight ranges for the graft monomer in the resin mixture based on the total weight of the mixture are 0.1–10 wt %, more preferably 0.3–10 wt %, more preferably 0.8–6 wt %, and more preferably 1–5 wt %, more preferably 1–4 wt %.

In one embodiment wherein the graft monomer is an acid or an amide or a derivative thereof, the graft monomers preferably comprise 0.1 and 10 wt % based on the total weight of the mixture, more preferably 0.3 to 8 wt %, and more preferably 0.5 to 5 wt %. In one embodiment wherein the graft monomer is an anhydride or an imide or a derivative thereof, the graft monomers preferably comprise 0.5 and 10 wt % based on the total weight of the mixture, more preferably 0.8 to 6 wt %, and more preferably 1 to 4 wt %. In one embodiment wherein the graft monomer is an alcohol or a derivative thereof, the graft monomers preferably comprise 0.1 and 10 wt % based on the total weight of the mixture, more preferably 0.3 to 8 wt %, and more preferably 0.5 to 5 wt %.

Preferred ranges for Saponification numbers of the resin mixture are 1–100, more preferably 3–100, more preferably 3–80 or 5–100, more preferably 5–50 or 8–60, more preferably 10–40, more preferably 10–30, more preferably 15–30, and more preferably 20–30. For example, in an embodiment wherein the graft monomer is an anhydride or an imide, the Saponification number of the resin mixture is 5–100, more preferably 8–60, more preferably 10–40, more preferably 15–30, and more preferably 20–30. In an embodiment wherein the graft monomer is an acid or amide, the Saponification number of the resin mixture is preferably 1–100, more preferably 3–80, more preferably 5–50, more preferably 5–40, more preferably 5–30, and more preferably 5–20.

Where the graft monomer is an alcohol, preferred ranges for the hydroxyl number (as determined by ASTM E 222 94) of the resin mixture are 1–100, more preferably 3–100, more preferably 3–80 or 5–100, more preferably 5–50 or 8–60, more preferably 10–40, preferably 10–30, more preferably 15–30, and more preferably 20–30. For example, in an embodiment wherein the graft monomer is a di-alchohol or a poly-alcohol (polyol), the hydroxyl number of the resin mixture is 5–100, more preferably 8–60, more preferably 10–40, more preferably 15–30, and more preferably 20–30. In an embodiment wherein the graft monomer is a mono-alcohol, the hydroxyl number of the resin mixture is preferably 1–100, more preferably 3–80, more preferably 5–50, more preferably 5–40, more preferably 5–30, and more preferably 5–20.

Blending into Adhesive Components and Compositions

Any of the previously described embodiments may be combined with other adhesive components and formulated into pressure sensitive adhesives, HMAs, or contact adhesives used in applications Such as tapes, labels, paper impregnation. HMA applications include woodworking, packaging, bookbinding or disposables. The embodiments described herein can also be formulated into compositions for sealants, rubber compounds, pipe wrapping, carpet backing, contact adhesives, road-marking and/or tires. These compositions may be used without further dilution as in the case of HMAs or they may be diluted in appropriate solvents to form solvent-based adhesives (SBAs) or dispersed in water to form resin emulsions for water-borne adhesives (WBAs).

Any of the previously described embodiments may be combined with or formulated into adhesives comprising polar polymers. As used herein, polar polymers include homopolymers, copolymers, and terpolymers containing polar groups such as esters, ethers, ketones, amides, imides, alcohols, phenols, halides, acids, anhydrides, sulfides, nitrites, isocyanates, aromatic and heteroaromatic groups. These polar substituents may be found in the polymer backbone, pendant to the polymer backbone or attached to an aromatic group that may be either incorporated in the polymer backbone or pendant to the polymer backbone. Suitable examples include copolymers of a $C_2$ to $C_{20}$ olefin, such as ethylene and/or propylene and/or butene with one or more polar monomers such as vinyl esters or alcohols, acids, anhydrides, acrylic or methacrylic acids or esters. Polar polymers also include any thermoplastic copolymer comprising a functional group capable of interacting with the unsaturated acid or anhydride group present with the resin material. Examples include, but are not limited to, polymers (or copolymers of) such as polyesters, polyamides polyureas, polycarbonates, polyacrylonitriles, polyacrylates, polymethylacrylates, ethylene vinyl esters, halogenated polymers, polyvinyl chloride, polyethylene terephthalate, polybutylene terephthalate (PBT), polyacetal, acrylic or methacrylic acids, alkyl acrylates, or methacrylates, ethylene methyl acrylate, ethylene butyl acrylate, and the like. Accordingly, in one embodiment, the grafted resin material may be formulated with a polar polymer, such as EVA. It may optionally comprise other components such as one or more waxes or oils.

Any of the previously described embodiments may be combined or combined with a polyolefin (base polymer) to form an adhesive. Typical base polymers include polyethylene, ethylene copolymerized with one or more $C_3$ to $C_{20}$ linear, branched, or cyclic α-olefins, polypropylene, propylene copolymerized with one or more of ethylene and/or $C_4$ to $C_{20}$ linear, branched, or cyclic α-olefins, polybutylene, polybutylene copolymerized with one or more of $C_5$ to $C_{20}$ linear, branched, or cyclic α-olefins, low density polyethylene (LDPE) (density 0.915 to less than 0.935 g/cm$^3$) linear low density polyethylene (LLPDE), ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (HDPE) (density 0.945 to 0.98 g/cm$^3$). Other hydrocarbon polymers (or copolymers of) include: polybutene-1, polyisobutylene, polybutene, polyisoprene, polybutadiene, butyl rubber, amorphous polypropylene, ethylene propylene diene monomer rubber, natural rubber, styrene butadiene rubber, copolymers and halogenated copolymers of isobutylene and para-alkylstyrene, elastomers such as ethylene-propylene rubber (EPR), vulcanized EPR, EPDM, nylons, polycarbonates, PET resins, polymers of aromatic monomers such as polystyrene, copolymers of isobutylene and para-alkyl styrene, high molecular weight HDPE, low molecular weight HDPE, graft copolymers generally, polyacrylonitrile homopolymer or copolymers, thermoplastic polyamides, polyacetal, polyvinylidine fluoride and other fluorinated elastomers, polyethylene glycols, polyisobutylene, or blends thereof. Preferred α-olefins include propylene, butene, pentene, hexene, heptene, octene, nonene, dodecene, cyclopentene, 3,5,5-trimethylhexene-1,3-methylpentene-1,4-methyl pentene-1 and terpolymers of the above monomers. In another embodiment, the copolymer comprises a terpolymer of (i) ethylene and/or (ii) a $C_3$ to $C_{20}$ comonomer, and (iii) a diene. Preferred dienes include butadiene, pentadiene, hexadiene, norbornene, ethylidene norbornene, vinyl norbornene, dicyclopentadiene, and substituted versions thereof. The architecture of such polymers may be linear, substantially linear, short-chain branched, long-chain branched, star branched or any other combination thereof. The branches or arms may be the same as the main backbone or different such as branch-block polymers or multi-armed stars.

Suitable polymers also include block copolymers of styrene and one or more conjugated dienes such as SI (Styrene-Isoprene), SBS (Styrene-Butadiene-Styrene), SB (Styrene-Butadiene), SIS (Styrene-Isoprene-Styrene). Styrene block copolymers comprising tetrablock or pentablock copolymers selected from SISI, SISB, SBSB, SBSI, ISISI, ISISB, BSISB, ISBSI, BSBSB, and BSBSI are also suitable. The block copolymers may be completely or partially hydrogenated to give a resulting SEBS (Styrene-Ethylene-Butene-Styrene) polymer. The architecture of the block copolymers includes linear, radial or multi-arm star, or multi-branched and may include various combinations of styrene, isoprene, or butadiene, which may or may not be hydrogenated.

Any of the previously described embodiments may be blended with grafted polymers or blends of grafted polymers and/or non-grafted polymers. Examples of polymers and of such blends include, but are not limited to, those described in U.S. Pat. No. 5,936,058.

Any of the previously described embodiments may be blended with elastomers to form adhesive sealants. Preferred elastomers include natural rubber, polyisoprene, polybutadiene, copolymers of butadiene with styrene, copolymers of butadiene with acrylonitrile, butyl rubber, polychloroprene, ethylene/propylene rubber and elastomeric copolymers of ethylene, propylene and a non-conjugated diene, styrenic block copolymers such as block copolymers of styrene and or α-methyl styrene with an alkadiene (such as isoprene or butadiene) in linear, radial, and/or tapered form.

In one embodiment, the base polymer may be a polymer produced using a metallocene catalyst system. Typically, the metallocene homopolymers or copolymers are produced using mono- or bis-cyclopentadienyl transition metal catalysts in combination with an activator of alumoxane and/or a non-coordinating anion in solution, slurry, high-pressure or gas phase. The catalyst system may be supported or unsupported and the cyclopentadienyl rings may be substituted or unsubstituted. Titanium, zirconium and hafnium are preferred transition metals. Several commercial products produced with such catalyst/activator combinations are commercially available from ExxonMobil Chemical Company in Baytown, Tex. under the tradenames EXCEED® and EXACT® or from Dow Chemical Company under the tradenames ENGAGE® and AFFINITY®.

The metallocene produced copolymers described above preferably have a polydispersity less than 4 and a composition distribution breadth index (CDBI) of 50% or more, preferably above 60%, even more preferably above 70%. In one embodiment, the CDBI is above 80%, even more preferably above 90%, even more preferably above 95%. In one embodiment, the polyethylene copolymer has a CDBI between 60–85%, even more preferably between 65–85%.

Composition Distribution Breadth Index (CDBI) is a measure of the composition distribution of monomer within the polymer chains and is measured by the procedure described in PCT publication WO 93/03093, published Feb. 18, 1993 including that fractions having a weight average molecular weight (Mw) below 15000 are ignored when determining CDBI.

Any of the previously described embodiments may be present in a blend of resin and base polymer. Suitable ratios of resin:base polymer include 1:1000 to 2:1, more preferably 1:2 to 2:1 and even more preferably between 3:1 and 1:3.

Any of the previously described embodiments may be admixed with additives well known in the art such as processing oils, performance oils, anti-block, anti-static, antioxidants, cross-linking agents, silica, carbon black, talc, pigments, fillers, processing aids, UV stabilizers, neutralizers, lubricants, anti-slip agents, slip agents, surfactants and/or nucleating agents. Examples of common additives include: antioxidants such as Irganox® 1010, silicon dioxide, titanium dioxide, polydimethylsiloxane, talc, dyes, wax, calcium stearate, carbon black and glass beads. In HMA applications, suitable synthetic waxes include paraffin and microcrystalline waxes having melting points within a range from about 55° C. to about 130° C. and low molecular weight polyethylene and Fischer-Tropsch waxes. The wax content is preferably from about 1 to about 35 wt. % of the total blend composition. In PSA applications, suitable oils include FLEXON® 876 or PRIMOL® 352 available from ExxonMobil Chemical Company at concentrations less than 50%.

Any of the previously described embodiments may be formulated into pressure sensitive adhesives that may be applied to any conventional backing layer such as paper, foil, polymeric film, release liners, woven or non-woven backing material to make for example, packaging tapes, masking tapes and labels.

One embodiment of a hot melt pressure sensitive comprises 100 parts by weight of a base polymer, preferably a styrene block copolymer, 50–150 phr (parts per 100 parts by weight base polymer) of a resin as described herein, 0–50 phr of an extender oil, more preferably 10–50 phr, more preferably 15–50 phr, more preferably 20–50 phr, more preferably 25–50 phr, more preferably 30–50 phr, more preferably 35–50 phr, more preferably 40–50 phr, more preferably 45–50 phr, and 0–5 phr anti-oxidant.

It is believed that the resin material formulations herein provide an advantage in hot melt pressure sensitive adhesives, namely the ability to increase the amount of oil used in the formulation above 10 parts per hundred parts based polymer (phr), more preferably 10–50 phr, more preferably above 15 phr, more preferably 15–50 phr, more preferably above 20 phr, more preferably 20–50 phr, more preferably above 25 phr, more preferably 25–50 phr, more preferably above 30 phr, more preferably 30–50 phr, 35–50 phr, more preferably 40–50 phr, while maintaining the cohesive strength of the adhesive formulation (as indicated by measurements in hot shear and SAFT).

Optional components in an HMA embodiment are plasticizers or other additives such as oils, tackifiers, surfactants, fillers, color masterbatches, and the like. Preferred plasticizers include mineral oils, polybutenes, phthalates, and the like. Particularly preferred plasticizers include phthalates such as diisodecyl phthalate (DIOP), diisononylphthalate (DINP), dioctylphthalates (DOP). Particularly preferred oils include aliphatic naphthenic oils.

Another optional component of an HMA composition is a low molecular weight product such as wax, oil, or low Mn polymer, (low meaning below Mn of 5000, preferably below 4000, more preferably below 3000, even more preferably below 2500). Preferred oils include aliphatic naphthenic oils, white oils, or the like. Preferred low Mn polymers include polymers of lower ax olefins such as propylene, butene, pentene, and hexene. A particularly preferred polymer includes polybutene having a Mn of less than 1000. An example of such a polymer is available under the trade name PARAPOL™ 950 from ExxonMobil Chemical Company. PARAPOL™ 950 is a liquid polybutene polymer having a Mn of 950 and a kinematic viscosity of 220 cSt at 100° C., as measured by ASTM D 445. Suitable embodiments of HMAs generally comprise 20–70 wt % resin material or blends as described herein, 30–80 wt % base polymer, and 0–35 wt % wax.

HMAs embodiments can be used for disposable diaper and napkin chassis construction, elastic attachment in disposable goods, converting, packaging, labeling, bookbinding, woodworking, and other assembly applications. Particular examples include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkins adhesive strip, industrial filtration bonding, industrial filter material lamination, filter mask lamination, surgical gown lamination, surgical drape lamination, and perishable products packaging. Suitable embodiments of woodworking applications comprise 30–50 wt % base polymers, preferably an EVA, 15–35 wt % resins as described herein, 20–50 wt % fillers, such as calcium carbonate, barium sulfate, silica or titanium dioxide. Suitable embodiments of bookbinding applications include 35–45 wt % base polymer, preferably an EVA, 35–45 wt % resin as described herein, and 10–25 wt % wax.

The present resin materials may be used to improve the elongation properties the adhesives of which they form a part. Improvement of tensile elongation properties are seen when the adhesive incorporates a resin material or blend as described herein when compared to some conventional resins.

It is believed that the present resin materials may be used to decrease the set time of a hot melt adhesive of which they form a part. Conventional HMAs have set times around 2 seconds. It is believed that incorporation of the resin materials described herein could decrease set times to 1.5 seconds or less, 1.4 seconds or less, 1.3 seconds or less, 1.2 seconds or less, 1.1 seconds or less, or even 1 second or less.

Additives for Polymers

The embodiments of this invention have novel utility as polymer additives in many applications. Other materials may be present depending upon the application. Many of the classes of polymer have been described earlier in the text. They may be used in polymer processing, for example in various molding applications where good spiral flow is needed and retention of physical properties is needed. A wide range of polymers, from polypropylene to engineering thermoplastics, are in this category. The resins of this invention also aid adhesion, cling, and tack. A wide range of polymers, for example in polyolefin films, tyre rubber compositions or rubber overmolded articles, are in this category. They may also be added to ink formulations to aid adhesion of the components as well as to the substrates. Other applications are in paint drying and concrete curing Additives for Road Marking The embodiments disclosed herein may be formulated into thermoplastic road-marking (TRM) compositions. Such formulation comprises a resin, plasticizer or an oil, pigment, fillers, glass beads. The grafted material of the invention can be used as the primary resin of the road-marking composition or as an additional additive to the road-marking composition. The road-marking compositions containing the grafted material of the invention can additionally comprise EVA, polyisobutylene, block copolymers comprising sytrene and a conjugated diene such as isoprene or butadiene (including, but not limited to SI, SIS, SB, and/or SBS), polyethylene waxes, rosin esters, rosin derivatives, maleic acid/anhydride modified hydrocarbon resin. The grafted material of the invention aids the dispersion of fillers and pigment yielding improved properties of fluidity and color. One embodiments of a TRM application comprises 10–40 wt % resin material or blends as described herein, 2–20 wt % pigment, such as $TiO_2$, 1–10 wt % oil, 0–7 wt % base polymers, and the remainder comprising a filler such as glass beads, calcium carbonate, sand, silica or others described herein.

Cross-Linking and Reactive Processing

The embodiments of this invention have a further advantage as polymer additives in inks and construction and road marking applications. They are capable of creating and participating in cross-linking within the composition medium by cross-linking with the other components of the adhesive formulation. The preferable example of anhydride or acid groups on the resin can cross-link with themselves or with other polymers present in the composition medium. Some polymers containing amine or alcoholic functionality will react directly with the grafted resin material, e.g., those polymers containing some vinyl alcohol groups. Others polymers will cross-link when a cross-linking agent is added. In these embodiment, the amount of cross-linking agent added is typically dependent on the amount of graft monomer present. Typical amounts include between 100:1 and 1:100, more preferably 1:1 parts cross linking agent per parts graft monomer (molar ratio) present in the formulation. These include polymers containing some acrylic acid such as ethylene alkyl-acrylate acrylic acid terpolymers or polymers containing succinic anhydride or acid groups such as maleic anhydride grafted ethylene propylene diene rubbers. Such cross-linking can be achieved in many ways, including the addition of difunctional agents capable of reacting w % ith the acid or anhydride groups. Examples of such materials are those containing alcohol and amine functionality such as diols, diamines, especially primary amines. The material having these functional groups may be mixed or have different substitutions, for example a diamine where one group is primary and the other is tertiary. Weaker cross-linking can be achieved via interactions which do not form covalent bonds such as ionic and hydrogen bonds. Examples of materials capable of cross-linking in such a manner are divalent metal ions such as $Ca^{++}$ or diamines containing quaternary amines.

Films

Films having one or more layers comprising the compositions disclosed herein may be employed as either mono- or multi-layer films or laminates and may be manufactured by any conventional process, including simple bubble extrusion, biaxial orientation processes (such as tenter frames, trapped bubble, or double bubble processes), simple cast/sheet extrusion-lamination, co-extrusion, lamination, extrusion coating, and co-extrusion coating, blowing and casting, etc. Should a multilayer film be desired, such may be obtained from a monolayer blown or cast film that can be combined with the other layers though conventional techniques such as adhesive lamination or extrusion lamination. Monolayer and coextruded films can also be produced by biaxial orientation processes. Extrusion coating is another suitable process. A heat-sealable film comprising a sealing layer as described herein may be extrusion coated onto a substrate either in the form of a monolayer or a multi-layer co-extruded substrate. A multi-layer extrudate can be produced via multiple extruders on multi-station tandem lines. The layers may be coextruded with other layer(s) of a multi-layer film or the sealing layer can be laminated onto another layer(s) or substrate, including paper, foil, oriented polypropylene, polyamides, polyesters, polyethylenes, polyethylene tereplithalate, metal and metallized substrates and other substrates discussed herein.

The film may be obtained by the flat film or tubular process which may be followed by orientation in an uniaxial direction or in two mutually perpendicular directions in the plane of the film. One or more of the layers of the film may be oriented in the transverse and/or longitudinal directions to the same or different extents. This orientation may occur before or after the individual layers are brought together. For example a polyethylene layer can be extrusion coated or laminated onto an oriented polypropylene or oriented polyester layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15 preferably 7 to 9. However in another embodiment the film is oriented to the same extent in both the MD and TD directions.

The layers of such films may comprise any polyolefin, polar polymer as described herein, cationic polymers including polymers or copolymers of geminally disubstituted olefins, alpha-heteroatom olefins and/or styrenic monomers. Preferred geminally disubstituted olefins include isobutylene, isopentene, isoheptene, isohexane, isooctene, isodecene, and isododecene. Preferred α-heteroatom olefins include vinyl ether and vinyl carbazole, preferred sty enic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-α-methyl styrene.

Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbonded fibers, and non-wovens (particularly polypropylene spun bonded fibers or non-wovens), and substrates coated with inks, dyes, pigments, PVC and the like.

The films may vary in thickness depending on the intended application, however films of a thickness from 1 to 250 μm are usually suitable. Films intended for packaging are usually from 10 to 60 µm thick. In many cases, the sealing layer will have a thickness between 5 and 60 µm, more preferably between 10 and 50 µm, and most preferably between 15 and 30 µm. There may be a sealing layer on both the inner and outer surfaces of the film or the sealing layer may be present on only the inner or the outer surface.

Film additives such as cling agents, antiblock agents, antioxidants, slip additives, pigments, fillers, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium stearate, carbon black, low molecular weight resins and glass beads.

In one embodiment, the layer(s) may comprise a crosslinking agent. Preferred crosslinking agents include alcohols, polyols, amines, diamines and/or triamines. Examples of crosslinking agents useful in this invention include polyamines such as ethylenediamine, diethylenetriamine, hexamethylenediamine, diethylaniinopropylamine, and/or menthanediamine.

Preferred antioxidants include phenolic antioxidants, such as Irganox 1010, Irganox, 1076 both available from Ciba-Geigy and 3,5 tertiary-butyl 4-hydroxy toluene. Preferred oils include paraffinic or napthenic oils such as Primol 352, or Primol 876 available from ExxonMobil Chemical France, S. A. in Paris, France. More preferred oils include aliphatic napthenic oils, white oils or the like.

Preferred plasticizers and/or adjuvants include mineral oils, polybutenes, phthalates and the like. Particularly preferred plasticizers include phthalates such as diisoundecyl phthalate (DIUP), diisononylphthalate (DINP), dioctylphthalates (DOP) and polybutenes, such as Parapol 950 and Parapol 1300 available from ExxonMobil Chemical Company in Houston Tex.

Preferred film processing aids, lubricants, waxes, and/or oils include low molecular weight products such as wax, oil or low Mn polymer, (low meaning below Mn of 5000, preferably below 4000, more preferably below 3000, even more preferably below 2500). Preferred waxes include polar or non-polar waxes, functionalized waxes, polypropylene waxes, polyethylene waxes, and wax modifiers. Preferred waxes include ESCOMER 101. Preferred low Mn polymers include polymers of lower alpha olefins such as propylene, butene, pentene, hexene and the like. A particularly preferred polymer includes polybutene having an Mn of less than 1000. An example of such a polymer is available under the trade name PARAPOL 950 from Exxon Chemical Company. PARAPOL 950 is an liquid polybutene polymer having an Mn of 950 and a kinematic viscosity of 220 cSt at 100° C., as measured by ASTM D 445.

In another embodiment one more layers may be modified by corona treatment, electron beam irradiation, gamma irradiation, flame treatment or microwave. In a preferred embodiment one or both of the surface layers is modified by corona treatment.

The films described above may be used as stretch and/or cling films. Stretch/cling films are used in various bundling, packaging and palletizing operations. To impart cling properties to, or improve the cling properties of, a particular film, a number of well-known tackifying additives have been utilized. Common tackifying additives include polybutenes, terpene resins, and hydrogenated rosins and rosin esters. The cling properties of a film can also be modified by the well-known physical process referred to as corona discharge. Some polymers (such as ethylene methyl acrylate copolymers) do not need cling additives and can be used as cling layers without tackifiers. Stretch/clings films may comprise a slip layer comprising any suitable polyolefin or combination of polyolefins such as polyethylene, polypropylene, copolymers of ethylene and propylene, and polymers obtained from ethylene and/or propylene copolymerized with minor amounts of other olefins, particularly $C_4$ to $C_{12}$ olefins. Particularly preferred are polypropylene and linear low density polyethylene (LLDPE). Suitable polypropylene is normally solid and isotactic, i.e., greater than 90% hot heptane insolubles, having wide ranging melt flow rates of from about 0.1 to about 300 g/10 min. Additionally, the slip layer may include one or more anticling (slip and/or antiblock) additives which may be added during the production of the polyolefin or subsequently blended in to improve the slip properties of this layer. Such additives are well-known in the art and include, for example, silicas, silicates, diatomaceous earths, talcs and various lubricants. These additives are preferably utilized in amounts ranging from about 100 ppm to about 20,000 ppm, more preferably between about 500 ppm to about 10,000 ppm, by weight based upon the weight of the slip layer. The slip layer may, if desired, also include one or more other additives as described above.

EXAMPLES

In the following examples HMAs were prepared as follows. The components of the HMA formulation were introduced in a Z-blade mixer previously heated at 180° C. under nitrogen blanketing. The waxes were introduced after 10 minutes, and the mixing was continued for another 60 min. The mixer was stopped, the nitrogen blanket was stopped, and the blend was poured into a tray. The blend was further cooled under nitrogen blanket and covered with a release paper.

HMA specimens were prepared for testing as follows. The adhesive was introduced in the hopper of an accumeter and melted at 150° C. under nitrogen. Strips of desired substrate carriers (polyethylene film of 200µ thickness, PET film of 100µ thickness, aluminium of 90µ thickness and/or acrylic-coated oriented polypropylene (OPP) film cardboard) were cut and coated with the molten adhesive.

For T-Peel testing, the HMA specimens were prepared for testing by cutting coated and un-coated substrates into pieces of about 25 cm length and 10 cm width. The non-coated substrate was laid on top of the coated substrate. The specimen was wrapped into a release paper which was further laminated with a hot press at a given temperature depending on the substrate, (110° C. for polyethylene, acrylic-coated OPP cardboard, 150° C. for Al, polypropylene and polyethylene terephthalate (PET)) under a pressure of 4400 pounds (114 psi/783 kPa) for 30 seconds. Strips of 2 cm width were cut from the laminated specimen(s) with a paper cutter in the coating direction. T-Peel strengths were measured with a tensile tester (Zwick). The F-average force (g/cm) for peeling was measured (average of at least 3 test specimens for each laminate). When jerking was indicated, ⅔ of the maximum peak was recorded. Failure types were also recorded in Tables 1–5: Adhesive Failure (AF), Cohesive Failure (CF), Jerking or No Jerking, and Tear.

Shear Adhesion Failure Temperature (SAFT) and Hot Shear test specimens were prepared the same as for T-Peel specimens except that strips of 25×70 mm were used and laid on stainless steel plates previously cleaned.

SAFT was determined by adhering a coated strip of the selected substrate to stainless steel with a contact area of 12.5×25 mm, hanging the samples in an oven held at 25° C. and suspending a 500 g weight from the bottom of the strip. The temperature was raised at 0.4° C./min and the bond failure temperature was measured. The Shear Adhesion Failure Temperature was the average of three tests.

Hot shear was measured by suspending a 1000 gram weight from a 25 mm wide strip of the selected substrate coated with the adhesive formulation which was adhered to a stainless steel plate with a contact area of 12.5×25 mm. The sample was placed in a ventilated oven at 40° C. for 30 minutes. The temperature was raised 10° C. at 30 minute intervals until stress failure occurred, up to 110° C. Typically, these tests were made and recorded individually to determine reliability of the holding power. Results are expressed in minute equivalents of 60° C. measurements, i.e., for each 10° C. increase above 60° C. where failure occurred, 30 minutes was added to the time.

Saponification number, as used herein, was measured according to the following procedure. 2 g of powdered resin material to be evaluated was dissolved in 25 ml toluene/isopropanol (1:1 wt ratio) and 50 ml of 0.1N alcoholic KOH was added by pipette. After refluxing for 30 min and cooling to room temperature the solution was titrated against 0.1N HCl using phenolphthaleine indicator. A blank run was carried out without resin material. Saponification number (mg KOH/g resin) was then calculated by multiplying 56.1 (approximate molecular weight of KOH)×volume of standard HCl×Normality of HCl divided by the weight of resin material sample.

Acid number, as used herein, was measured according to following procedure. 2 g of powdered resin material was dissolved in 30 ml toluene/isopropanol (2:1 wt ratio). After the sample was completely dissolved, it was potentiometrically titrated with a 0.1 N tetrabutyl ammonium hydroxide (TBAOH) under vigorous stirring, using a Pt titrode and a Ag/AgCl electrode with outer LiCl electrolyte in saturated ethanol. A blank run was carried out without the resin material. The acid number was then calculated by multiplying 56.1 (approximate molecular weight of KOH) with the volume of TBAOH used to titrate the sample minus the TBAOH volume to titrate the blank multiplied by the normality of TBAOH divided by the weight of resin material. The acid number was expressed in milligrams of potassium hydroxide per gram of resin, (mg KOH/g resin).

In the following examples, all parts, proportions, and percentages are by weight unless otherwise indicated. The following materials were used:

| Ethylene Vinyl Acetate Copolymer | MI (g/10 min) | Density (g/cm3) | Vinyl acetate (%) | Source |
|---|---|---|---|---|
| ESCORENE® UL 40028 | 400 | 0.947 | 28 | ExxonMobil Chemical Company |
| ESCORENE® UL 53019 | 530 | 0.934 | 19 | ExxonMobil Chemical Company |
| ESCORENE® UL 05540 | 60 | 0.969 | 39 | ExxonMobil Chemical Company |

| Component | Description | Source |
|---|---|---|
| Vector® 4511 | Styrene-Isoprene-Styrene block copolymer (styrene content 18%, isoprene content 82%, melt index 15, specific gravity 0.94) | Dexco Polymers, Plaquemine, LA |
| Escorez® 2203 | $C_5/C_9$ hydrocarbon resin (SP 93° C., Mn 1100, Tg 46° C.) | ExxonMobil Chemical France, SA |
| Flexon® 876 | Extender Oil | ExxonMobil Chemical Company |
| Irganox® 1010, 1076 | Phenolic antioxidant | Ciba-Geigy |
| Np Wax | PARAFFIN WAX 68° C. Normal paraffin (Np) wax (Melting point 68° C.) | TotalElfAtoFina |
| FT Wax | PARAFLINT H1, Fischer Tropsch polyethylene wax | Schumman-Sasol |

Example 1 (Comparative)

A thermally polymerized hydrogenated aromatic containing DCPD resin (available as Escorez®5600 from Exxon-Mobil Chemical Company having a softening point of 103° C., Mn 270, and Tg 55° C.) was blended in an HMA formulation according to Table 1.

Example 2 (Comparative)

A tall oil rosin ester available as Sylvalite® RE 100 available from Arizona Chemical Company (softening point 96° C., Mn 950, Mw 1110, Saponification no. 26, and acid no. 5.5) was blended in an HMA formulation according to Table 1.

Example 3 (Comparative)

A tall oil rosin ester available as Sylvalite® RE 100 available from Arizona Chemical Company (softening point 100° C., Mn 810, Mw 1060, Saponification no. 28, and acid no. 13.7) was blended in an HMA formulation according to Table 1.

Example 4 (Comparative)

A terpene phenolic resin available as Dertophene T from Dérivés Résiniques Terpéniques (softening point 95° C., Mn 490, Mw 700 and initial color 4.5 Gardner) was blended in an HMA formulation according to Table 1. Examples 1–4 were then examined using T-Peel on polyethylene to polyethylene and PET to PET, and Hot Shear and SAFT on polyethylene to stainless steel and on PET to stainless steel. The results from Examples 1–4 are shown in the Tables and used as a reference for comparison with later examples.

Example 5

100 g of a thermally polymerized hydrogenated aromatic containing DCPD resin, same as the Escorez® 5600 resin tested in Example 1, but without anti-oxidant, containing 7.5% aromatic protons and 0.01% olefinic protons having a softening point of 103° C., was heated to and maintained at 170° C. in a 250 ml flask fitted with a stirrer under nitrogen. 5.5 g dibutyl maleate was added. Four aliquots of 0.75 ml 2,5-dimethyl-2,5-di(tert-butylperoxy)hexane (Luperox® 101) were added at 15 minute intervals. After completion of the peroxide addition the mixture was stirred for a further 75 minutes under a nitrogen flow to remove volatile materials. The resulting reaction product was poured from the reactor, cooled and analysed. The grafted resin product had a Gardner colour of 3.5 (50 wt % in toluene), a softening point of 84° C., and a Saponification number of 17.

Example 6

100 g of a thermally polymerized partially hydrogenated aromatic containing DCPD resin, same as the Escorez® 5600 resin tested in Example 17 but without anti-oxidant, having a softening point 103° C., 7.5% aromatic protons and 0.01% olefinic protons indicated by $^1$H NMR spectroscopy was heated in a 500 ml flask fitted with stirrer under nitrogen to and maintained at 170° C. When liquid, 1.23 g maleic anhydride powder was added and blended. Five 0.1 ml aliquots of 2,5-dimethyl-2,5-di(tert-butylperoxy)hexane (Luperox 101) where added to the stirred liquid at 15 minute intervals and the reaction was continued for a further 60 minutes with a flow of nitrogen to remove volatile peroxide decomposition products and any residual unreacted maleic anhydride. The melt was poured out of the reaction flask and allowed to cool and solidify. The resulting grafted resin had a softening point 105° C., Gardner colour of 3.5, and a Saponification number of 10.

Example 7

250 g of a thermally polymerized partially hydrogenated aromatic containing DCPD resin, same as the Escorez® 5600 resin tested in Example 1, but without anti-oxidant, having a softening point 103° C. and 7.5% aromatic and 0.01% olefinic protons as indicated by $^1$H NMR spectroscopy was heated in a 500 ml flask fitted with stirrer under nitrogen to and maintained at 170° C. When liquid, 6.13 g maleic anhydride powder was added and blended. Five 0.25 ml aliquots of 2,5-dimethyl-2,5-di(tert-butylperoxy)hexane were added to the stirred liquid at 10 minute intervals and the reaction was continued for a further 20 minutes with a flow of nitrogen to remove volatile peroxide decomposition products and any residual unreacted maleic anhydride. The melt was poured out of the reaction flask and allowed to cool and solidify. The resulting grafted resin had a softening point 105° C., Gardner color of 3.6, and a Saponification number of 20.

Example 8

100 g of a thermally polymerized partially hydrogenated aromatic containing DCPD resin, same as the Escorez® 5600 resin tested in Example 1, but without anti-oxidant, having a softening point 103° C., 7.5% aromatic protons and 0.01% olefinic protons as indicated by $^1$H NMR spectroscopy was heated in a 500 ml flask fitted with stirrer under nitrogen to and maintained at 170° C. When liquid, 4.9 g maleic anhydride powder was added and blended. Four 0.5 ml aliquots of 2,5-dimethyl-2,5-di(tert-butylperoxy)hexane were added to the stirred liquid at 15 minute intervals and the reaction was continued for a further 75 minutes with a flow of nitrogen to remove volatile peroxide decomposition products and any residual unreacted maleic anhydride. The melt was poured out of the reaction flask and allowed to cool and solidify. The resulting grafted resin had a softening point 112° C., Gardner color of 8, and a Saponification number of 40.

Examples 9–12

The grafted resins from Examples 5–8 were blended in an HMA formulation was blended in an HMA formulation according to Table 1. The formulations in Examples 9–12 were then examined using T-Peel on polyethylene to polyethylene and PET to PET, and Hot Shear and SAFT on polyethylene to stainless steel and on PET to stainless steel. The results for Examples 9–12 are shown in Table 1 and FIGS. 1–6. Note for T-Peel: only the peeling force (F-average) was represented. When the sample was only jerking, it corresponds to a zero adhesion force.

These results show that on polyethylene substrates, most of the grafted resins perform similarly to reference Examples 1–4 for adhesion. On the other hand, for Hot Shear and SAFT most of the grafted resins are superior to references Examples 1–4, especially examples 6/10, 7/11 and 8/12 where graft monomer was maleic anhydride. These results also illustrate that on a polar substrate such as PET, the grafted resins have better adhesion compared to the ungrafted resin of Example 1 and the tall oil rosin esters of Examples 2 and 3, which show only jerking. As illustrated in FIGS. 1–6, the Hot Shear and SAFT results show that the grafted resins of Examples 6/10, 7/11 and 8/12 are equal to or superior to the reference Examples 1–4.

Example 13

700 g of a hydrogenated trimer and tetramer mixture of oligomers of cyclopentadiene, methyl cyclopentadiene and $C_9$–$C_{10}$ aromatic olefins was removed from the overhead stream of a product stripping tower in a commercial manufacturing process for a thermally polymerized aromatic containing DCPD hydrocarbon resin at an ExxonMobil production facility in Notre Dame de Gravenchon, France. The oligomers obtained did not contain anti-oxidant and contained 7.4% aromatic protons and 0% olefinic protons. The oligomers were stirred under nitrogen at 160° C. with 70 g maleic anhydride powder in a 2 liter flask. Six 3 ml aliquots of 2,5-dimethyl-2,5-di(tert-butylperoxy)hexane were added at 0, 10, 20, 30, 45 and 75 minutes elapsed time. The reaction stirring continued for a further 45 minutes with a flow of nitrogen through the flask to remove any volatile components. The reactor was cooled to 140° C. and the product was poured into cold paraffinic hydrocarbon solvent having boiling in the range of 160–192° C. by ASTM D-1078 (available as Exxsol D from ExxonMobil Chemical Company). The insoluble reaction product was filtered off and washed with heptane to remove residual traces of unreacted oligomers and any peroxide decomposition products. The yield was 120 g of grafted oligomers having softening point 107° C., Gardner Color 12 (acetone:toluene 1:1 wt), and a Saponification number of 336.

Example 14–17

Figure 13:
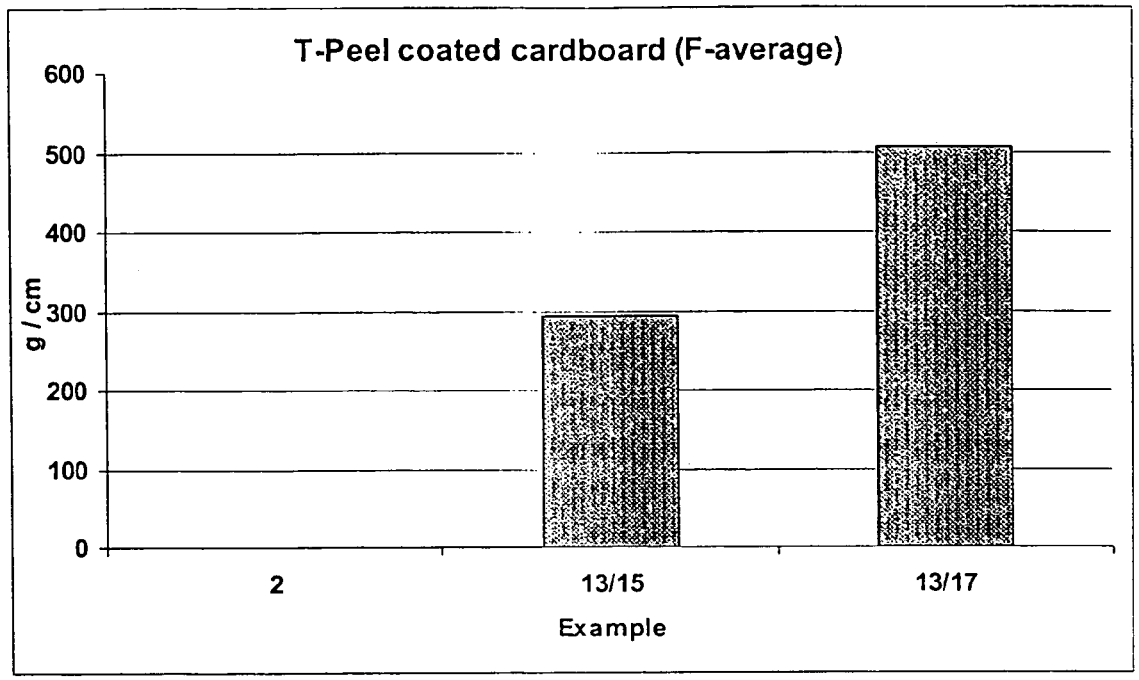
FIGS. 13–15 illustrate the comparative performance on acrylic-coated oriented polypropylene film coated cardboard substrates between hot melt adhesives containing resin material comprising grafted oligomers and hot melt adhesives containing other resin materials.
Figure 14:
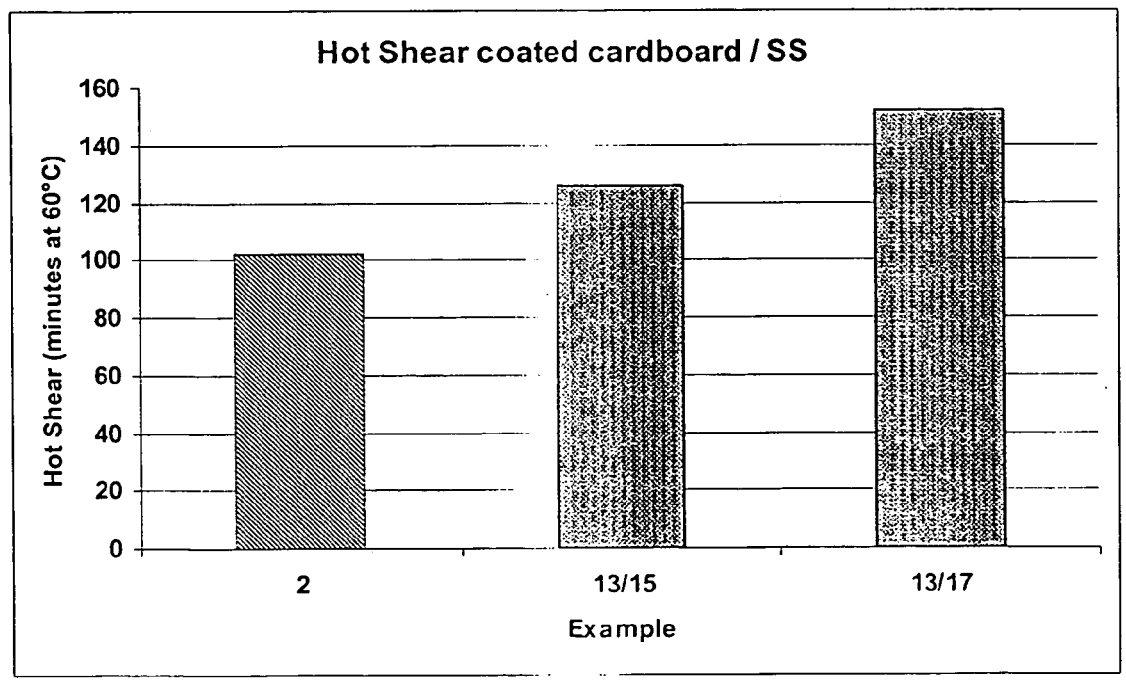
Figure 15:
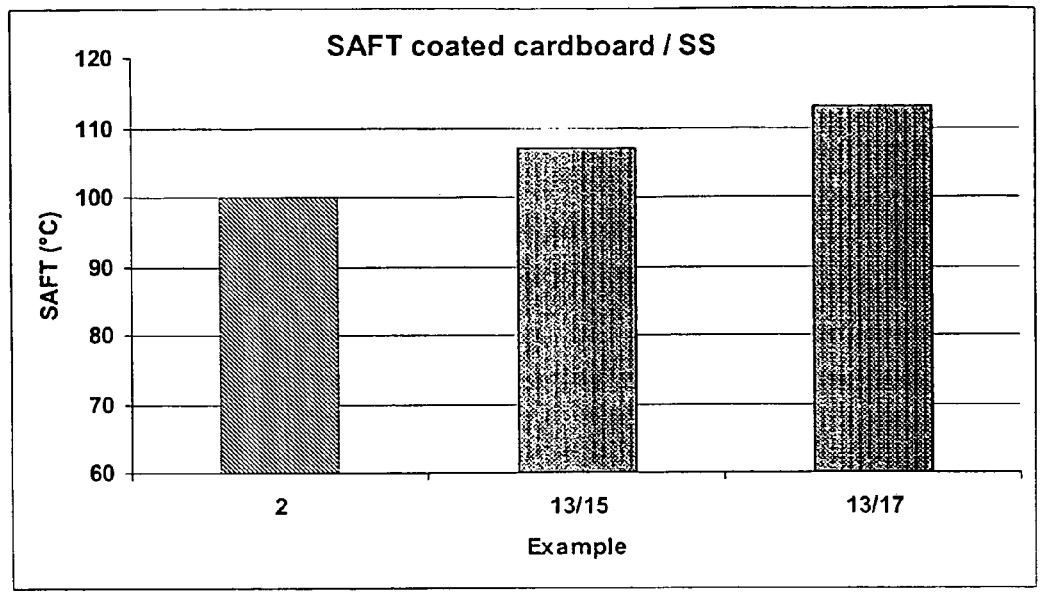

The grafted oligomers from Example 13 were blended with a thermally polymerized hydrogenated aromatic containing DCPD resin (Escorez® 5600) in various ratios of oligomers to resin to form a resin material. The amounts of grafted oligomer in the resin material was varied between 5 and 30 wt %. The resin material was then blended in an HMA formulation according to Table 1. T-Peel on polyethylene to polyethylene and PET to PET, and Hot Shear and SAFT on polyethylene to stainless steel and on PET to stainless steel have been measured. The results from Examples 14–17 are shown in Table 2 and 4 and FIGS. 7–12. T-Peel tests on Examples 15 and 17 were also conducted on acrylic-coated OPP cardboard (denoted as AC) and compared to similar results generated with an HMA formulation produced by Example 2. Those results are shown in Table 2 and FIGS. 13–15.

Table 2 and FIGS. 7–12 illustrate that resin materials containing grafted oligomers show overall comparable behavior on polyethylene substrates when compared to reference Examples 1–4. These results also illustrate that on a polar substrate such as PET, a significant advantage is achieved with resin material containing grafted oligomers, especially for adhesion. These results illustrate that Hot Shear and SAFT are significantly higher for resin material containing grafted oligomers when compared to reference Examples 1–4. The results from Table 5 and FIGS. 13–15 also illustrate that the resin material containing grafted oligomers has superior performance over the tall oil rosin ester tested in Example 2 on acrylic-coated OPP cardboard, especially for adhesion.

Examples 18–23

Packaging tape formulations having the components shown in Table 3 were mixed in a Winkworth AZ mixer at 145° C. with a rear blade speed of 59 RPM. Ten minutes after the set temperature of 145° C. was achieved, nitrogen blanketing was started and the block copolymer, ⅕ of the total resin, and the Irganox anti-oxidant were added and mixed. The start time was considered as the time when the block copolymer was added. After 10 minutes of mixing, an additional ⅖ of the total resin was added. When shear was observed, the remaining ⅕ of the resin was added. At 30 minutes after the start time, all of the oil was added, and the components were mixed until 70 minutes from the start time. The mixture was then poured into a tray and covered with release paper. Specimens were then prepared by coating a Mylar substrate with a accumeter coater at 175° C. to a total coating weight of approximately 19 g/m². Before testing all samples were conditioned at least 16 hours at 23° C. and 50% relative humidity. Specimens were then cut into strips depending on the requirements of the tests performed. The following testing procedures were used for Examples 18–23.

Ball tack was determined by a procedure based on Test Method 6 of the PSTC Testing Methods. Specimens 2.5 cm wide and 25 cm long were cut and the release liner removed. The specimen was fixed with the adhesive side upwards onto a lab bench. The ball tack tester was placed onto the specimen in line with the specimen's longitudinal axis. A steel ball (5.6 g, 7/16 inch (1.11 cm) diameter) was removed from solvent with tweezers and dried with paper. The dried ball was placed in the trough of the ball tack tester at the release position with tweezers, released, and allowed to roll on the adhesive layer. The distance was measured in cm from the center of the ball to the end of the incline of the ball tack tester. The measurement was repeated on two additional specimens taken from the same pressure sensitive material and the average measurement is noted in the Table.

Loop tack evaluated the force required to separate at a specified speed a loop of adhesive from a standard test plate. Stainless steel plates were stored in Nappar 6 solvent. Before testing they were dried with absorbing paper and cleaned with acetone. The testing was performed in the coating direction of the specimen. The adhesive was covered with release paper and test specimens were cut (2.5 cm wide and 22 cm long). The release liner was then removed from the test specimen. A loop was formed with the adhesive layer on the outside. The adhesive on the two ends of the loop was protected with paper so that no direct contact between the adhesive and the pneumatic clamp of the peel tester was possible. The two protected ends of the loop were clamped over a distance of 15 mm leaving the loop hanging vertically downwards. A clean test plate was placed in the loop tack fixture, with the length direction of the plate positioned perpendicularly to the plane of the loop. The tensile tester was started to bring the loop of adhesive film in contact with the test plate at the set speed of 300 mm/min. The specimen was applied on the plate without any other force than the weight of the specimen itself. The machine was stopped as soon as the loop made full contact with the test and the recorder started. The specimen was allowed to separate from the plate at a speed of 300 mm/min. At least 3 test specimens of the same formulation were measured and the maximum force necessary to completely separate a loop from the plate was recorded. The value given in the Table is the average value for the three tests.

180° Peel Adhesion evaluated the peel adhesion of a specimen. Peel adhesion evaluated the force required to peel off a pressure sensitive adhesive from a standard test plate at a specified angle (in this case 180° C.) and speed. Stainless steel plates were stored in solvent (Nappar 6). Before testing, the plates were dried with absorbing paper and cleaned with acetone. The testing was performed in the coating direction of the specimen. The adhesive surface of the specimens to be tested were covered with release paper and specimens 25 mm wide and 22 cm long were cut. The release liner was partially removed from the strip, hereafter the loose end. The portion of the specimen free of release paper was stuck on a clean and conditioned test plate in the length-direction, without any force. The specimen was positioned in an Automatic Roll Down Machine and the speed set to 60 cm/min. The sample(s) were rolled twice up and down. The sample was tested within one minute of preparation. Three centimeters of the release paper on the specimen at the loose end were peeled off. The metal plate of the test specimen was clamped vertically in a lower clamp. The loose end of the specimen was folded back (180°) and fixed in the upper clamp. The force necessary to peel the specimen from the metal plate was recorded. Three specimens per adhesive sample were measured and the average of each curve taken, ignoring extreme peaks as well as the start/end part of the plot. In case of Jerking, ⅔ of the average of the highest peaks was recorded. Shear on cardboard was measured by suspending a 1000 gram weight from a 25 mm wide strip of the specimen coated with the adhesive formulation which was adhered to cardboard with a contact area of 12.5×25 mm. The sample was placed in a ventilated oven at 40° C. Time as recorded until stress failure occurs. Typically, these tests were made and recorded individually to determine reliability of the holding power.

Shear was used to measure the temperature and time at which bond failure occurs when the adhesive joint is submitted to a defined temperature (40° C.) under a defined stress. The SAFT (Shear Adhesion Failure Temperature) method was used to measure the temperature at which an adhesive bond fails when it is submitted to a defined stress when the temperature is raised at 0.4° C./min. SAFT tests were conducted as follows. Stainless steel plates stored in Nappar 6 solvent were dried with absorbing paper and cleaned with acetone. The testing was performed in the coating direction of the adhesive on the specimen. Release paper covered specimens 2.5 cm wide and minimum 6 cm long were made, and the release liner was removed. One end of the sample was reinforced by obtaining a 2.5 cm wide and 3 cm long piece of release liner and adhering 1.5 cm of the release liner onto the end of the specimen. The remaining 1.5 cm was folded back over onto the adhered end of the release liner and stapled twice horizontally. The specimen was then positioned without pressure on the stainless steel test plate. The contact area between the specimen and the stainless steel plate was 25 mm wide×12.5 mm high. The contact area was rolled twice with a 0.9 kg (2 lb.) rubber roller in each width direction at a moderate speed with no other force than the weight of the roller itself. One arm of a shear triangle was then position in the fold of the is release liner so that no part of the shear triangle contacted the adhesive. The prepared samples were then installed on a sample support, a weight of 0.5 kg was fixed to the shear triangle and then placed in an oven. The experiments were started at 24° C. The temperature was raised 0.4° C. per minute. The SAFT was recorded at the temperature at which the bond failed. Five tests were conducted for each adhesive formulation, and the average of the five tests is listed in the Table.

The data in Table 3 show that shear on cardboard at 40° C. is greatly increased in pressure sensitive adhesive formulations containing both a conventional hydrocarbon resin and the grafted hydrocarbon resins described herein, while yielding, a ball tack of 3.9 cm, which is not far from the industry preference of less than 3.0 cm. In examples 22 and 23, the ball tack fell to 3.0 or less, but most surprisingly the hot shear on cardboard value rose to even higher levels. Thus, there is an unexpected performance enhancement of hot shear when the adhesive formulation contains both a conventional hydrocarbon resin and a grafted resin as described herein.

Examples 24–32

HMA formulations were made with the components and their parts by weight listed in Table 4. Dot T-Peel tests on the formulations were conducted as follows. A series of acrylic coated OPP cardboard substrates were cut into 2.5 cm×7.5 cm strips and weighed. The HMA formulations were made as previously described and heated to 170° C. in an aluminum block. When the HMA was molten, a warm glass eyedropper was used to apply a line of beads of approximately 0.3 mm diameter to the acrylic coated OPP side of the substrate leaving 2.5 cm of the end of the substrate free of HMA. A second strip of the acrylic coated OPP cardboard with the cardboard side down was immediately applied to the first strip having the adhesive thereon and rolled with a standard 0.9 kg (2 lb.) roller starting from the end having the adhesive. The assembled structure was then weighed to determined the amount of adhesive between the substrates. The specimens were then cooled to the temperature at which the T-Peel measurements were conducted (25° C.). T-Peel strengths were then measured with a Zwick Tensile Tester. The average force (g/cm) for peeling was measured (average of 3 test specimens).

Figure 16:
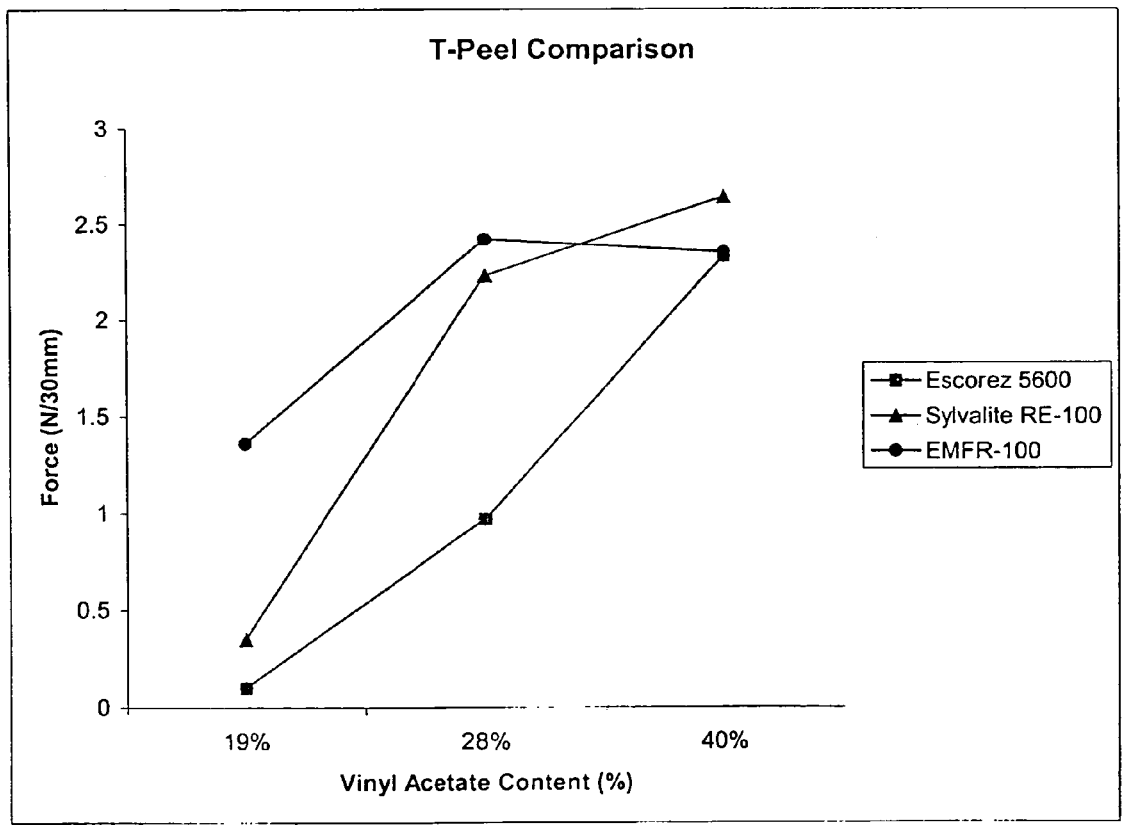
FIG. 16 illustrates the comparative performance of a grafted resin versus a non-grafted resin and a TORE in hot melt adhesives comprising ethylene vinyl acetates containing varying amounts of vinyl acetate.

The results shown in Table 4 and FIG. 16 illustrate that the grafted resins of the present invention give better Dot T-Peel performance for EVAs having lower vinyl acetate contents (i.e., 19 wt % and 28 wt %). The EMFR-100 used in Examples 18–32 is a hydrogenated thermally polymerized aromatic containing dicyclopentadiene hydrocarbon resin (Escorez® 5600) grafted with maleic anhydride (Mn 214, Mw/Mn 2.3, softening point 98° C., Saponification No. 24, 2.55 wt % maleic anhydride content). Use of the grafted resin (EMFR-100) greatly enhances the performance of the 19% EVA relative to TORE (Sylvalite) and Escorez 5600 whereas the impact of this grafted resin declines as the VA content of the EVA rises to 40%. Thus, use of the grafted resins allows formulation with 19% VA content EVA at lower cost than would normally be available to the adhesive industry. In addition, the use of grafted resin in conjunction with 28% VA content EVA enhances performance to the level of that encountered with TORE resins.

As is apparent from the foregoing description, the materials prepared and the procedures followed relate to specific preferred embodiments of the broad invention. It is apparent from the foregoing general description and the specific embodiments that, while forms of the invention have been illustrated and described, various modifications can be made without departing from the spirit and scope of this invention. Accordingly, it is not intended that the invention be limited thereby. In the following claims which represent the invention in specific embodiments, each dependent embodiment for each of the below independent embodiments may be practiced with one or more of the limitations of the other dependent embodiments so as to represent other operable embodiments within the scope of the invention claimed.

TABLE 1

Grafted Resin HMA formulations

| | Example(s) | | | | | | | |
|---|---|---|---|---|---|---|---|---|
| | 1 | 2 | 3 | 4 | 9 | 10 | 11 | 12 |
| Components (parts by weight) | | | | | | | | |
| Resin | 45 | 45 | 45 | 45 | 45 | 45 | 45 | 45 |
| Escorene ® UL 40028 | 35 | 35 | 35 | 35 | 35 | 35 | 35 | 35 |
| Np Wax | 10 | 10 | 10 | 10 | 10 | 10 | 10 | 10 |
| FT Wax | 10 | 10 | 10 | 10 | 10 | 10 | 10 | 10 |
| Irganox ® 1010 | 0.5 | 0.5 | 0.5 | 0.5 | 0.5 | 0.5 | 0.5 | 0.5 |
| Resin Cloud Point (° C.) | 85 | 88 | 145 | 85 | 84 | 84 | 83 | >200 |

TABLE 1-continued

Grafted Resin HMA formulations

| | Example(s) | | | | | | | |
|---|---|---|---|---|---|---|---|---|
| | 1 | 2 | 3 | 4 | 9 | 10 | 11 | 12 |
| Resin Softening Point (° C.) | 101 | 105 | 104 | 103 | 102 | 102 | 102 | 103 |
| T-Peel PE/PE (g/cm) | 874 | 1098 | 720 | 1306 | 968 | 1045 | 1036 | 673 |
| Failure Type | AF + CF | CF | AF | CF | CF | CF | CF | CF PE Tear |
| T-Peel PE/PE (g/cm) | No Jerking | No Jerking | No Jerking | No Jerking | No Jerking | No Jerking | No Jerking | CF |
| Hot Shear PE/ss (minutes at 60° C.) | 23 | 16 | 15 | 17 | 14 | 28 | 29 | 27 |
| SAFT PE/ss (° C.) | 67 | 66 | 65 | 66 | 64 | 67 | 68 | 68 |
| T-Peel PET/PET (g/cm) | 0 | 0 | 0 | 293 | 546 | 0 | 0 | 225 |
| Failure Type | Jerking | Jerking | Jerking | CF + Jerking | CF | Jerking | Jerking | CF |
| T-Peel PET/PET (g/cm) | 15 | 287 | 228 | 509 | 454 | 154 | 225 | 252 |
| Hot Shear PET/ss (minutes at 60° C.) | 25 | <21 | 33 | 23 | 25 | 34 | 35 | 36 |
| SAFT PET/ss (° C.) | 67 | 68 | 67 | 67 | 65 | 68 | 69 | 69 |

TABLE 2

Grafted Oligomer/Hydrocarbon Resin HMA formulations

| | Example(s) | | | | | | | |
|---|---|---|---|---|---|---|---|---|
| | 1 | 2 | 3 | 4 | 14 | 15 | 16 | 17 |
| Components (parts by weight) | | | | | | | | |
| Resin | 45 | 45 | 45 | 45 | 45 | 45 | 45 | 45 |
| Resin Components | | | | | | | | |
| Grafted Oligomers (wt %) | | | | | 5 | 10 | 20 | 30 |
| Hydrocarbon resin (wt %) | | | | | 95 | 90 | 80 | 70 |
| Escorene ® UL 40028 | 35 | 35 | 35 | 35 | 35 | 35 | 35 | 35 |
| Np Wax | 10 | 10 | 10 | 10 | 10 | 10 | 10 | 10 |
| FT Wax | 10 | 10 | 10 | 10 | 10 | 10 | 10 | 10 |
| Irganox ® 1010 | 0.5 | 0.5 | 0.5 | 0.5 | 0.5 | 0.5 | 0.5 | 0.5 |
| Resin Cloud Point (° C.) | 85 | 88 | 145 | 85 | >200 | >200 | >200 | >200 |
| Resin Softening Point (° C.) | 101 | 105 | 104 | 103 | 102 | 102 | 102 | 103 |
| T-Peel PE/PE (g/cm) | 874 | 1098 | 720 | 1306 | 733 | 966 | 885 | 1018 |
| Failure Type | AF + CF | CF | AF | CF | AF PE Tear | CF PE Tear | AF + CF PE Tear | AF + CF PE Tear |
| T-Peel PE/PE (g/cm) | No Jerking | No Jerking | No Jerking | No Jerking | No Jerking | No Jerking | No Jerking | No Jerking |
| Hot Shear PE/ss (minutes at 60° C.) | 23 | 16 | 15 | 17 | 24 | 17 | 13 | 23 |
| SAFT PE/ss (° C.) | 67 | 66 | 65 | 66 | 67 | 67 | 68 | 68 |
| T-Peel PET/PET (g/cm) | 0 | 0 | 0 | 293 | 0 | 0 | 495 | 494 |
| Failure Type | Jerking | Jerking | Jerking + AF | CF | Jerking | CF Tendency to Jerk | AF + CF | CF |
| T-Peel PET/PET (g/cm) | 15 | 287 | 228 | 509 | 50 | 219 | Tendency to Jerk | No Jerking |
| Hot Shear PET/ss (min. at 60° C.) | 23 | 16 | 15 | 17 | 44 | 174 | 108[1] | 0 |
| SAFT PET/ss (° C.) | 67 | 68 | 67 | 67 | 90[2] | 109[3] | 93[4] | 50 |
| T-Peel AC/AC (g/cm) | | 0 | | | | 294 | | 507 |
| Failure Type | | Jerking | | | | AF | | AF |

TABLE 2-continued

Grafted Oligomer/Hydrocarbon Resin HMA formulations

| | Example(s) | | | | | | | |
|---|---|---|---|---|---|---|---|---|
| | 1 | 2 | 3 | 4 | 14 | 15 | 16 | 17 |
| T-Peel AC/AC (g/cm) | | 274 | | | | No Jerking | | No Jerking |
| Hot Shear AC/ss (minutes at 60° C.) | | 102 | | | | 126 | | 152 |
| SAFT PET/ss (° C.) | | 100 | | | | 107 | | >113 |

Superscripts indicate average measurement, ranges disclosed as follows,
[1]36–180,
[2]69–110,
[3]86–120,
[4]75–110

TABLE 3

Examples 18–23

| | Example | | | | | |
|---|---|---|---|---|---|---|
| | 18 | 19 | 20 | 21 | 22 | 23 |
| Components (parts by weight) | | | | | | |
| Escorez ® 2203 | 110 | | | 55 | 75 | 90 |
| EMFR-100 | | 110 | | 55 | 35 | 20 |
| Escorez ® 5600 | | | 110 | | | |
| Vector ® 4511 | 110 | 110 | 110 | 110 | 110 | 110 |
| Flexon ® 876 | 10 | 10 | 10 | 10 | 10 | 10 |
| Irganox ® 1076 | 1 | 1 | 1 | 1 | 1 | 1 |
| 180° Peel on SS (N/cm) | 6.0 | 3.4 | 5.6 | 5.5 | 5.3 | 5.3 |
| Hot Shear on cardboard at 40° C. (min) | 503 | 252 | 804 | 4417 | >9819 | >9819 |
| Ball tack (cm) | 1.8 | >20 | 6.1 | 3.9 | 3 | 2.9 |
| Loop tack on SS (N/25 mm) | 21 | 4.2 | 17.5 | 15.8 | 18.2 | 19.2 |
| SAFT on SS (° C.) | 93.5 | 79.2 | 78.7 | 87.8 | 92.5 | 94.9 |

TABLE 4

Examples 24–32

| | Example | | | | | | | | |
|---|---|---|---|---|---|---|---|---|---|
| | 24 | 25 | 26 | 27 | 28 | 29 | 30 | 31 | 32 |
| Component (parts by weight) | | | | | | | | | |
| Escorez ® 5600 | 45 | | | 45 | | | 45 | | |
| Sylvalite ® RE100 | | 45 | | | 45 | | | 45 | |
| EMFR-100 | | | 45 | | | 45 | | | 45 |
| Escorene ® UL 53019 | 35 | 35 | 35 | | | | | | |
| Escorene ® UL 05540 | | | | 35 | 35 | 35 | | | |
| Escorene ® UL 40028 | | | | | | | 35 | 35 | 35 |
| Np Wax | 10 | 10 | 10 | 10 | 10 | 10 | 10 | 10 | 10 |
| FT Wax | 10 | 10 | 10 | 10 | 10 | 10 | 10 | 10 | 10 |
| Irganox ® 1010 | 0.5 | 0.5 | 0.5 | 0.5 | 0.5 | 0.5 | 0.5 | 0.5 | 0.5 |
| DOT T-Peel (25° C.) acrylic coated OPP/Cardboard (g/cm) | 0.1 | 0.35 | 1.36 | 2.33 | 2.64 | 2.35 | 0.97 | 2.23 | 2.42 |

The invention claimed is:

1. A composition comprising
an at least partially hydrogenated thermally polymerized aromatic-containing cycloaliphatic hydrocarbon resin grafted with a graft monomer, wherein the graft monomer:resin weight ratio in the grafted resin is less than 1:1; and
between 0.1 and 99 wt % grafted oligomers having monomer units selected from cyclopentadiene and substituted cyclopentadiene, $C_5$ monomers, and $C_9$ monomers.

2. The composition according to claim 1, comprising between 0.1 and 30 wt % grafted oligomers having monomer units selected from (i) cyclopentadiene and substituted cyclopentadiene, and (ii) $C_9$ monomer units.

3. The composition according to claim 1, further comprising at least one other resin selected from the group consisting of: aliphatic hydrocarbon resins, at least partially hydrogenated aliphatic hydrocarbon resins, aliphatic/aromatic hydrocarbon resins, at least partially hydrogenated aliphatic/aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, aromatic hydrocarbon resins, at least partially hydrogenated aromatic hydrocarbon resins, polyterpene resins, terpene-phenol resins, rosin esters, rosin acids, resins grafted with graft monomers, and mixtures of any two or more thereof.

4. The composition according to claim 1, further comprising at least one polyolefin.

5. The composition according to claim 4, wherein the polyolefin is selected from the group consisting of: polyethylene, an ethylene α-olefin ($C_3$–$C_{20}$) copolymer, polypropylene, a propylene α-olefin ($C_4$–$C_{20}$) copolymer, polybutylene, a butylene α-olefin ($C_5$–$C_{20}$) copolymer, a polyisobutylene polymer, α-olefin diene copolymers, block copolymers comprising styrene and a conjugated diene, and mixtures of two or more thereof.

6. The composition according to claim 1, further comprising at least one polar polymer.

7. The composition according to claim 6, wherein the polar polymer is selected from the group consisting of polyesters, polyamides, polyureas, polycarbonates, polyacrylonitriles, polyacrylates, polymethylacrylates, ethylene vinyl acetate copolymers, polyvinyl chloride, polyethylene terephthalate, polybutylene terephthalate, polyacetals, ethylene methyl acrylate, ethylene butyl acrylate, and mixtures of two or more thereof.

8. The composition according to claim 1, further comprising a polymer comprising ethylene or propylene and having a CDBI greater than 50% and a polydispersity of less than 4.

9. The composition according to claim 4, further comprising at least one wax or oil.

10. The composition according to claim 6, further comprising at least one wax or oil.

11. The composition according to claim 8, further comprising at least one wax or oil.

12. A composition comprising
(1) an at least partially hydrogenated thermally polymerized aromatic-containing cycloaliphatic hydrocarbon resin grafted with a graft monomer, wherein the graft monomer:resin weight ratio in the grafted resin is less than 1:1, wherein the hydrocarbon resin prior to grafting contains less than 5% olefinic protons; and
(2) between 0.1 and 99 wt % grafted oligomers having monomer units selected from cyclopentadiene and substituted cyclopentadiene, $C_5$ monomers, and $C_9$ monomers.

13. The composition according to claim 12, comprising between 0.1 and 30 wt % grafted oligomers having monomer units selected from (i) cyclopentadiene and substituted cyclopentadiene, and (ii) $C_9$ monomer units.

14. The composition according to claim 12, further comprising at least one other resin selected from the group consisting of: aliphatic hydrocarbon resins, at least partially hydrogenated aliphatic hydrocarbon resins, aliphatic/aromatic hydrocarbon resins, at least partially hydrogenated aliphatic/aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, aromatic hydrocarbon resins, at least partially hydrogenated aromatic hydrocarbon resins, polyterpene resins, terpene-phenol resins, rosin esters, rosin acids, resins grafted with graft monomers, and mixtures of any two or more thereof.

* * * * *